United States Patent
Berzinis

(10) Patent No.: US 7,928,156 B2
(45) Date of Patent: Apr. 19, 2011

(54) NANOCOMPOSITE COMPRISING EXFOLIATED NANOCLAY-STYRENIC CONCENTRATE AND METHODS OF PREPARATION

(75) Inventor: Albin P. Berzinis, Delmar, NY (US)

(73) Assignee: Sabic Innovative Plastics IP B.V. (NL)

( * ) Notice: Subject to any disclaimer, the term of this patent is extended or adjusted under 35 U.S.C. 154(b) by 131 days.

(21) Appl. No.: 12/272,136

(22) Filed: Nov. 17, 2008

(65) Prior Publication Data

US 2009/0326134 A1 Dec. 31, 2009

(51) Int. Cl.
*C08K 3/34* (2006.01)
*C08F 283/08* (2006.01)
(52) U.S. Cl. ........................ 524/445; 525/391
(58) Field of Classification Search ............... 524/445
See application file for complete search history.

(56) References Cited

U.S. PATENT DOCUMENTS

| 7,250,477 B2* | 7/2007 | Guo et al. | 525/391 |
| 2006/0255494 A1* | 11/2006 | Ohtomo et al. | 264/171.1 |
| 2007/0079748 A1* | 4/2007 | Ahmed et al. | 116/206 |

OTHER PUBLICATIONS

Translation of KR 1020060053387, Dec. 20, 2007.*

M. Okamoto, Recent advances in polymer/layered silicate nanocomposites: an overview from science to technology, Materials Science and Technology, 2006, vol. 22, No. 7, 756-779.

Myoung Whan Noh, Dong Choo Lee, Synthesis and characterization of PS-clay nanocomposite by emulsion polymerization, Polymer Bulletin 42, 619-626 (1999).

KR Unexamined Patent Publication, Application No. 10-2006-0053387, application date: Jun. 14, 2006, Iventor Sang-Won Lee, Translation, 10 pages.

* cited by examiner

*Primary Examiner* — Ling-Siu Choi
*Assistant Examiner* — Hui Chin
(74) *Attorney, Agent, or Firm* — Cantor Colburn LLP

(57) ABSTRACT

A composition is disclosed comprising a styrenic first polymer, nanoclay, and an emulsifier compound, which can be blended with an additional polymer. A nanocomposite exhibits improved heat resistant properties and stiffness. In one embodiment, the additional polymer is poly(phenylene ether). An article and a method for the preparation a nanocomposite are also disclosed. In one embodiment, the process of obtaining a nanocomposite comprises emulsion polymerizing styrenic monomers in the presence of an aqueous dispersion of nanoclay and emulsifier compound, wherein an aqueous mixed dispersion comprising styrenic polymer and nanoclay is formed; coagulating the aqueous mixed dispersion with a coagulating agent to form a coagulated mixed dispersion comprising nanoclay and styrenic polymer; solidifying the coagulated mixed dispersion to form a polymeric clay concentrate comprising the nanoclay and the styrenic polymer as a carrier resin; and mixing the polymeric nanoclay concentrate, directly or indirectly with an additional polymer to form a nanocomposite.

17 Claims, 4 Drawing Sheets

NANOCOMPOSITE COMPRISING EXFOLIATED NANOCLAY-STYRENIC CONCENTRATE AND METHODS OF PREPARATION

FIELD OF THE INVENTION

A nanocomposite composition comprising nanoclay and polymeric polymer were prepared that resulted in improved physical and mechanical properties. Processes for producing the nanocomposite and articles produced from the nanocomposite are also disclosed.

BACKGROUND OF THE INVENTION

Metal silicates and other layered clays are known that are arranged in layered structures, stacked in an orderly fashion. Nanocomposites can be obtained by admixing of polymers with the layered clay to break the ordered layering into particles with size less than about 100 nm. The nanocomposites can be made by blending of clay with polymer or blending of clay with monomer followed by in situ polymerization.

There has been considerable interest over the past decade in development of such nanocomposites, for example so-called polymer/layered silicate nanocomposites (PLSNCs), because they can often exhibit remarkably improved mechanical and other properties when compared with the polymer alone or other composites. Some clays commonly used for the preparation of polymer/layered silicate nanocomposites (PLSNCs) belong to the same general family of phyllosilicates. Their crystal structure can consist of layers made up of two silica tetrahedral fused to an edge shared octahedral sheet of either aluminum or magnesium hydroxide. The layer can have a thickness of about 1 nm and the lateral dimensions of these layers can vary from 30 nm to several micrometers and even larger depending on the particular layered silicate. Stacking of the layers can lead to a regular van der Waals gap between the layers called the interlayer or gallery. In order to realize the potential enhancement in properties from the very high aspect ratios of these clay fillers, a polymer matrix can be intercalated between the stacked layers and the individual layers ultimately dispersed throughout the polymer matrix, which can be referred to as exfoliation.

Commonly used layered silicates include montmorillonite (MMT), hectorite and saponite. This type of clay can be characterized by a moderate surface charge, for example, a cation exchange capacity (CEC) of 80 to 120 mequiv/100 g and a layered morphology. These clays can be compatible with hydrophilic polymers such as, for example, poly(ethylene oxide) (PEO) and poly(vinyl alcohol)(PVA).

As described in the recent comprehensive review article by Okamoto "Recent advances in polymer/layered silicate nanocomposites: an overview from science to technology" by M. Okamoto in *Materials Science and Technology* 22 (2006) 756-778, one of the very few commercially successful example of a PLSNC based on organoclays is that pioneered by Toyota Research wherein the organoclay is first dispersed in caprolactam monomer. The organoclay-caprolactam dispersion is then subjected to condensation polymerization conditions to create a Nylon 6-PLSNC by what is referred to as an in situ process resulting in exfoliation of the nanoclay. As described in the review there are few other examples of successful preparation of PLSNC by an in situ process, yet it is also very difficult to achieve results beyond intercalation by melt extrusion compounding of organoclays into hydrophobic engineering resins. As a result the properties of PLSNCs are seldom very attractive due to the difficulty in achieving substantial amounts of exfoliation.

Unexamined Korean Patent Application 10-2006-0053387, published Dec. 20, 2007, discloses the preparation of PS-PLSNC which can be subsequently used to prepare a PS/PPE (polystyrene/poly(phenylene oxide) blend by extrusion compounding. This patent application discloses the use of a reactive vinylbenzylamine to prepare a reactive organoclay that was then dispersed in styrene monomer and subjected to bulk polymerization. Examples of PS-PLSNC containing up to 5% clay are given which show no signal in XRD and appear exfoliated. When the clay content of the PS-PLSNC is increased to 8% a signal is returned in the XRD scan. The PS-PLSNCs were combined with PPE in 20/80 ratios by melt extrusion and showed an increase in glass transition temperature and storage modulus. With the limitation of no more than 5% clay in the PS-PLSNC and only 20 parts of said PS-PLSNC in the PPO blend, the effective clay concentration in the PPO/PS-PLSNC blend appears limited to 2%.

Thus, it would be desirable to obtain nanocomposites, and articles fabricated from them, that can provide improved properties or advantages, especially by achieving exfoliation of layered nanoparticles in various polymeric compositions.

BRIEF SUMMARY OF THE INVENTION

A composition is disclosed comprising a styrenic polymer, a nanoclay, an additional polymer; and an emulsifier compound in a residual amount of at least 500 ppm, based on total weight of the composition wherein the nanoclay comprises particles that are exfoliated in a polymeric matrix, comprising the styrenic polymer and an additional polymer.

In one embodiment, the nanocomposite can provide, at the same time, a significant improvement in heat resistant properties and stiffness (represented by tensile and flex properties).

Such a nanocomposite can be made from a composition, used as a polymeric nanoclay concentrate for blending with the additional polymer, which composition comprises a styrenic polymer in an amount of greater than or equal to 70 percent and less than or equal than 95 percent, based on total weight of composition, a nanoclay in an amount of greater than or equal to 5 percent and less than or equal to 30 percent, based on total weight of composition, an emulsifier compound in a amount of 1 to 10 percent, based on total weight of composition, wherein the nanoclay has been substantially untreated with respect to cation exchange, and where the nanoclay comprises particles that are exfoliated in a polymeric matrix comprising the styrenic polymer.

In a specific embodiment, the composition comprises a poly(phenylene ether).

Another aspect of the present disclosure is directed to a method of making a polymeric nanoclay concentrate for blending with an additional polymer. Also disclosed is a method of making a nanocomposite composition using the polymeric nanoclay concentrate. Articles comprising the nanocomposite composition are also disclosed.

More particularly, one embodiment of a process for obtaining the nanocomposite comprises: emulsion polymerizing a reaction mixture comprising styrenic monomers in the presence of an aqueous dispersion of nanoclay and emulsifier compound, wherein an aqueous mixed dispersion comprising styrenic polymer and nanoclay is formed; coagulating the aqueous mixed dispersion with a coagulating agent to form a coagulated mixed dispersion comprising nanoclay and styrenic polymer; solidifying the coagulated mixed dispersion to form a polymeric clay concentrate comprising the nanoclay and the styrenic polymer as a carrier resin; and melt-mixing the polymeric nanoclay concentrate with an additional polymer to form a nanocomposite; wherein the nanoclay is exfoliated in a polymeric matrix comprising the styrenic polymer and an additional polymer.

These and other features, aspects, and advantages of the present invention will become better understood when the following detailed description is read with reference to the accompanying Figures, wherein:

DETAILED DESCRIPTION OF THE PREFERRED EMBODIMENTS

Figure 1:
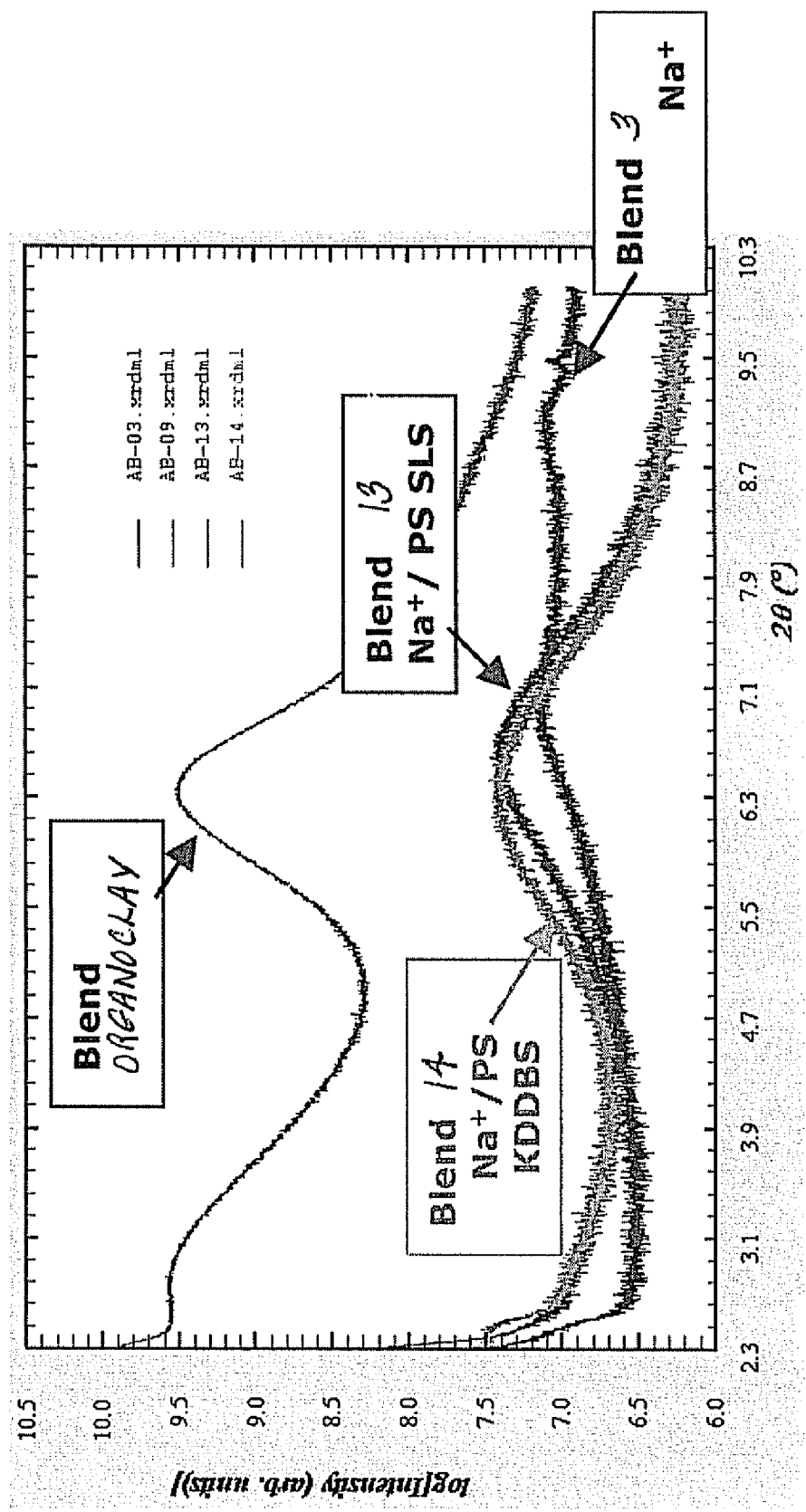
FIG. 1 shows a transmission electron microscope (TEM) image of a nanocomposite made from a polymeric nanoclay concentrate blend having 10 wt % nanoclay in accordance with the Examples below.

Dispersion" or "dispersed" refers to the distribution of the particles of the nanoclay in the polymeric matrix of the nanocomposite.

"Intercalated" or "intercalate" refers to a higher degree of interaction between the polymer matrix and the nanoclay as compared to mere dispersion of the nanoclay in the polymer matrix. When the polymer matrix is said to intercalate the nanoclay, the nanoclay exhibits an increase in the interlayer spacing between adjacent platelet surfaces as compared to the starting nanoclay.

"Delamination" refers to the process of separation of ordered layers of clay platelets through the interaction of the nanoclay with the polymer matrix.

"Exfoliate" or "exfoliated" refers to platelets or layers dispersed mostly in an individual state throughout a polymer matrix material. Herein, "exfoliated" is used to denote a higher degree of separation of platelet particles or layers than intercalated nanoclay. "Exfoliated" can include residual stacking of nanoclay particles that is not inconsistent with substantial exfoliation, as determined by a combination of TEM and XRD analysis, including location, breadth, and intensity of peaks in the XRD, and by comparison to intercalated nanoclay, as shown in the examples below and as would be understood by the skilled artisan. "Exfoliation" refers to the process by which an exfoliate is formed from an intercalated or otherwise dispersed nanoclay material within a polymer matrix.

"Nanocomposite(s)" and "nanocomposite composition(s)" refer to a polymeric material (including copolymer) having dispersed therein a plurality of individual clay platelets obtained from a layered clay material.

"Nanoclay" refers to particles of a clay material, useful for making nanocomposites, which particles can comprise layers or platelet particles (platelets) obtained from particles comprising layers and, depending on the stage of production, can be in a stacked, intercalated, or exfoliated state.

"Thermoplastic matrix," "polymeric matrix," or the like refers to the polymeric phase of the nanocomposite in which the particles of nanoclay form a non-continuous or dispersed phase. The polymeric matrix can include a continuous polymeric phase as well as resin dispersed in a continuous polymeric phase.

As noted, in one embodiment, a composition comprises a styrenic polymer, a nanoclay, an additional polymer, and residual emulsifier compound of at least 500 ppm based on the total weight of the composition. The amount of residual emulsifier compound can range from 500 to 25,000 ppm, based on the total weight of the nanocomposite.

Such a nanocomposite can be obtained from a polymeric nanoclay concentrate comprising nanoclay in a styrenic polymer, which styrenic polymer has been made by emulsion polymerization in the presence of an aqueous dispersion of the nanoclay and emulsifier compound to form a dispersed aqueous mixture of the nanoclay and styrenic polymer that is then coagulated. Finally, the components of the polymeric nanoclay concentrate can be blended with an additional polymer to form the nanocomposite.

When the polymeric nanoclay concentrate is blended with an additional polymer, the nanoclay is exfoliated in a thermoplastic matrix composition comprising the styrenic polymer and an additional polymer. This is an unexpected and advantageous achievement, specifically when the nanoclay has not been treated with organic intercalants or the like except the emulsifier compound during emulsion polymerization. In the context of the polymeric nanoclay concentrate or the resulting nanocomposite, the term "exfoliated" can include substantially exfoliated in which greater than or equal to 70 percent, specifically greater than or equal to 80 percent, of the X-ray diffraction peak intensity (height) has been lost due to the exfoliation, as shown by standard measurement as provided in the examples below.

The emulsifier compound in the nanocomposite, in one embodiment, is a surfactant, which can act as an emulsifier during the process of making the nanocomposite. The emulsifier can be an organic salt, more specifically an organic salt comprising an anionic substituent on an organic moiety, with a cationic counter ion, for example, including a $C_2$-$C_{30}$ organic moiety, specifically a $C_6$-$C_{20}$ organic moiety. The emulsifier compound specifically is capable of dispersing the monomers of the styrenic polymer for emulsion polymerization, for example, in a process such as described below. A specific example of such an anionic emulsifier compound is an organic sulfonate.

The emulsifier compound can be present in an amount of greater than or equal to 1 wt % and less than or equal to 10 wt % in the aqueous dispersion, more specifically greater than or equal to 2 wt % and less than or equal to 6 wt %, by weight solids in the aqueous dispersion.

The nanocomposite can be the result of blending a polymeric nanoclay concentrate with an additional polymer in the nanocomposite, for example wherein the weight ratio of the styrenic polymer, as a carrier for the nanoclay, to the total of the additional polymer in the nanocomposite can be 1:15 to 10:1, more specifically 1:10 to 1:1. For example, in one specific embodiment, a ratio, by weight of 40:60 is used.

In another embodiment, a nanocomposite is made by the process of: obtaining a polymeric nanoclay concentrate, comprising nanoclay in a styrenic polymer, obtained by coagulating a mixture of the nanoclay and the styrenic polymer in the form of a latex, wherein the styrenic polymer has been formed by emulsion polymerization in the presence of an aqueous dispersion of the nanoclay and emulsifier compound, wherein the polymeric nanoclay concentrate comprises clay nanoparticles present in an amount of greater than or equal to 5 wt % and less than or equal to 30 wt %, specifically in an amount of greater than or equal to 8 wt % and less than or equal to 24 wt % by weight of total composition, and the styrenic polymer in an amount of greater than or equal to 70 wt % and less than or equal than 95 wt %, by weight of total composition, specifically greater than or equal to 76 wt % and less than or equal than 92 wt %, by weight of total composition; and melt blending the contents of the polymeric nanoclay concentrate with an additional polymer to obtain a nanocomposite, wherein the nanocomposite comprises clay in an amount of greater than or equal to 1 wt % and less than or equal to 10 wt %, specifically amount of greater than or equal to 2 wt %, by weight of total composition, and the total polymer is present in an amount of greater than or equal to 9 wt % and less than or equal than 99 wt %, specifically an amount less than or equal than 98 wt %, by weight of total composition, in the nanocomposite. In one embodiment, the percent of nanoclay in the nanocomposite is reduced by greater than 50 wt % from the percent nanoclay in the polymeric clay concentrate.

Accordingly, the clay nanoclay particles in the nanocomposite can be exfoliated in a thermoplastic matrix comprising a blend of the polystyrene polymer and the additional polymer.

As indicated above, in one embodiment, the present nanocomposite can be prepared by a process comprising:

emulsion polymerizing, in an aqueous carrier, a reaction mixture comprising styrenic monomers in the presence of an aqueous dispersion of nanoclay and emulsifier compound, wherein an aqueous mixed dispersion comprising styrenic polymer and nanoclay is formed; coagulating the aqueous mixed dispersion with a coagulating agent to form a coagulated mixed dispersion comprising nanoclay and styrenic polymer; solidifying the coagulated mixed dispersion to form a polymeric clay concentrate comprising the nanoclay and the styrenic polymer as a carrier resin; and mixing the polymeric nanoclay concentrate, directly or indirectly, with an additional polymer to form a nanocomposite.

Such a process can result in the clay nanoparticles in the nanocomposite becoming exfoliated in the thermoplastic matrix comprising a blend of the styrenic resin and the additional polymer. Specifically, the clay nanoparticles can be exfoliated, to a substantial extent allowing for some residual stacking, in both the polymeric nanoclay concentrate and the nanocomposite as determined by X-ray diffraction (XRD) and TEM, in accordance with the examples below.

In one embodiment, the nanoclay is not an organoclay. Specifically, the nanoclay has not been subject to cation exchange with an organic compound or salt. For example, the nanoclay has not been substantially untreated with an organic quaternary ammonium salt or vinyl-functionalized.

In one embodiment of the process, the coagulating agent can comprise an inorganic salt. Following coagulation, the aqueous mixed dispersion can be solidified by filtering, optionally under vacuum, and dried, optionally in a vacuum oven. The polymeric nanoclay concentrate can be melt compounded with an additional polymer using, for example, a twin-screw extruder or the like.

In another embodiment of the process, an emulsion polymerization step can comprise dispersing nanoclay in an aqueous carrier, subjecting the nanoclay to mixing and heating until nanoclay particles have swollen and dispersed to form a viscous solution, and dripping a feed of the reaction mixture and initiator into the aqueous dispersion of nanoclay to form emulsion particles of the styrenic polymer. Furthermore, a coagulation step can comprise dripping the mixed aqueous dispersion of nanoclay and styrenic polymer into a coagulate solution that has been heated to obtain a slurry. Further still, a solidification step can comprises filtering the slurry under vacuum to obtain a wet cake, optionally reslurrying and refiltering, and drying the wet cake under vacuum at an elevated temperature. Finally, a mixing step can comprise melt blending the polymeric nanoclay concentrate with an additional polymer in an extruder. In one specific embodiment, an additional polymer can comprise poly(phenylene ether).

As indicated above, in an advantageous embodiment, the nanoclay in the nanocomposite is not an organoclay. Specifically the nanoclay has been substantially untreated to effect cation exchange, specifically cationic exchange with an organic compound or salt (for example, has been substantially untreated with an organic quaternary ammonium salt or with a quatemary-amine-bearing vinyl functionality). By the term "substantially untreated" is meant that the nanoclay has been largely untreated, i.e., less than 50 percent, specifically less than 85 percent, more specifically less than 95 percent, for example, 0 percent) of the maximum amount of such treatment has been applied to the nanoclay, based on the weight of treatment material added to the nanoclay, as would be understood by one of ordinary skill in the art.

By the term "organoclay" is meant nanoclay which contain less than or equal to 40% by weight organic compounds, specifically less than or equal to 15% by weight organic compounds, more specifically less than or equal to 10% by weight organic compounds, still more specifically less than 5% (for example, 0% by weight organic compounds), based on the total weight of the nanoclay used to make the polymeric nanoclay concentrate.

In one embodiment, the present nanocomposite composition can comprise particles of a layered-clay material that is selected from the group consisting of natural, synthetic, and modified phyllosilicates. Natural clays include smectite clays such as montmorillonite, saponite, hectorite, mica, vermiculite, bentonite, nontronite, beidellite, volkonskoite, saponite, magadite, kenyaite, and the like. Synthetic clays can include synthetic mica, synthetic saponite, synthetic hectorite, and the like. Modified clays can include fluorinated montmorillonite, fluorinated mica, and the like. Clays are available from various commercial sources such as Nanocor, Inc., Laviosa Chimnica Mineraria, Southern Clay Products, Kunimine Industries, Ltd., and Elementis Specialties, Inc.

Generally, nanoclays useful for making nanocomposites can be layered clay materials comprising an agglomeration of individual platelet particles that are closely stacked together in domains called tactoids. Individual platelet particles of the clays specifically can have thickness of less than about 2 nm. Specifically, the clay nanoparticles used to make the nanocomposites can be a layered silicate, more specifically layered silicates selected from the group consisting of montmorillonite, hectorite, and saponite. The layered clay particles become exfoliated into individual layers particles or platelets during manufacture of the nanocomposite.

In one embodiment, the layers of the clay nanopartices are 50 to 500 nm in average diameter, specifically 100 to 300 nm, where average diameter is based on the longest length. TEM (Transmission Electron Microscopy) image analysis can be used to determine diameter, as in the examples below. A log normal distribution of particle size diameter can be present.

In one embodiment, the negative charge on the surface of the layered inorganic materials is at least 20 milliequivalents, preferably at least 50 milliequivalents, and more preferably from 50 to 150 milliequivalents, per 100 grams of the multilayered material.

Although the clay materials can comprise refined but unmodified clays, modified clays or mixtures of modified and unmodified clays can be used in the present nanocomposites.

The styrenic polymer used as a carrier in the polymeric nanoclay concentrate can contain at least 25 weight percent of structural units derived from a monomer represented by the following structure (I):

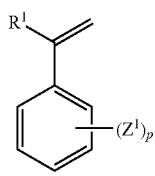

wherein $R^1$ is hydrogen, lower alkyl having from 1 to 7 carbon atoms, or halogen; $Z^1$ is vinyl, halogen or lower alkyl having from 1 to 7 carbon atoms; and p is from 1 to 5.

This styrenic polymer can be a homopolymer of styrene, chlorostyrene, or vinyltoluene, or a random copolymer of styrene with one or more monomers selected from the group consisting of acrylonitrile, butadiene, alpha-methylstyrene, ethylvinylbenzene, divinylbenzene, maleic anhydride, as well as acrylic monomers and their esters, for example, methyl acrylate and acrylate monomers.

The polymeric nanoclay concentrate can be melt compounded with an additional polymer. Specifically, an additional polymer can comprise a thermoplastic polymer, including either a hydrophilic or hydrophobic thermoplastic polymer that can be miscibly blended with the styrenic polymer in the nanocomposite.

The additional polymers can be a thermoplastic polymer selected from the group consisting of poly(arylene ether)s, polyamides, polyesters, polyolefins, and second styrenic polymers. Homopolymers and copolymers of polyolefin can include, for example, EPR, EPDM and polyolefin-block-copolymers. In one embodiment, any one of the aforementioned additional polymers can be used in a major amount, based on the total weight of polymers in the composition.

The additional polymer can comprise a second styrenic polymer, which can be the same as, or different from, in terms of composition or properties (for example, molecular weight), the styrenic polymer used as a carrier for the nanoclay in the concentrate.

For example, the nanocomposite can include an additional polymer selected from the group consisting of polystyrene homopolymers, high-impact polystyrene (HIPS), halogenated polystyrenes, styrene-maleic anhydride copolymers, acrylonitrile-butadiene-styrene copolymers, styrene-acrylonitrile copolymers, poly-alpha-methylstyrenes, and mixtures of one or more of the foregoing polymers. In one embodiment, the nanocomposite can comprises poly(phenylene ether), which in one embodiment is present in a major amount, based on the total weight of polymers in the composition.

In one embodiment, the weight ratio of the styrenic polymer to the total of the additional polymers blended in the nanocomposite, as mentioned above, can be 1:15 to 10:1, specifically 1:10 to 1:1.

In another embodiment, the polymeric nanoclay concentrate can also be blended with an additional polymer comprising a rubber or elastomeric component. In one embodiment, a rubber or elastomeric component is present in a minor amount, based on the total weight of additional polymers. In one embodiment, as secondary additional polymer can be blended with the polymeric nanoclay concentrate prior to melt blending with a primary additional polymer, in which the primary additional polymer is present in a major amount, based on total weight of additional polymers. In one embodiment, a secondary component polymer can comprise a diene or non-diene based rubber. For example, secondary component polymers can comprise a polymer selected from the group consisting of styrene-butadiene copolymer, acrylonitrile-butadiene copolymer, ethylene-α-olefin copolymer, ethylene-α-olefin-polyene copolymer, polyacrylic ester, styrene-butadiene block copolymer (SB), styrene-butadiene-styrene block copolymer (SBS), styrene-isoprene block copolymer (SI), styrene-isoprene-styrene block copolymer (SIS), hydrogenated styrene-butadiene block copolymer (SEB), hydrogenated styrene-butadiene-styrene block copolymer (SEBS), ethylene-propylene elastomer, ethylene-graft-ethylene-propylene elastomer, ethylenic ionomer resin, hydrogenated styrene-isoprene block copolymer (SEP), hydrogenated styrene-isoprene-styrene block copolymer (SEPS), poly(butadiene), poly(butyl acrylate).

As indicated above, the nanocomposite can comprise various poly(arylene ether)s, by mixing with the polymeric nanoclay concentrate. The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, include known polymers that can comprise a plurality of structural units of the formula (II):

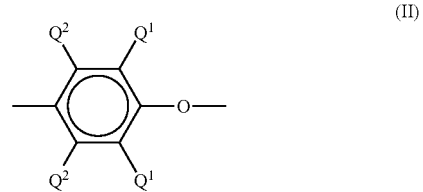

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Specifically, each $Q^1$ can be alkyl or phenyl, especially $C_{1-4}$ alkyl, and each $Q^2$ can be hydrogen.

Both homopolymer and copolymer poly(arylene ether) can be included. Specific homopolymers are those containing 2,6-dimethylphenylene ether units. Specific copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention can further include combinations comprising at least one of the above.

The poly(arylene ether) generally can have a number average molecular weight of about 3,000-40,000 atomic mass units (amu) and a weight average molecular weight of about 20,000-80,000 amu, as determined by gel permeation chromatography. The poly(arylene ether) can have an intrinsic viscosity of about 0.10 to about 0.60 deciliters per gram (dl/g), specifically about 0.29 to about 0.48 dl/g, as measured in chloroform at 25° C. In one embodiment, a high intrinsic viscosity poly(arylene ether) and a low intrinsic viscosity poly(arylene ether) can be used in combination. Determining an exact ratio, when two intrinsic viscosities are used, can depend somewhat on the exact intrinsic viscosities of the poly(arylene ether) used and the ultimate physical properties that are desired.

The poly(arylene ether) can be prepared by the oxidative coupling of at least one monohydroxyaromatic compound such as 2,6-xylenol or 2,3,6-trimethylphenol. Catalyst systems can be generally employed for such coupling; they can typically contain at least one heavy metal compound such as a copper, manganese or cobalt compound, usually in combination with various other materials.

Particularly useful poly(arylene ethers) for many purposes are those which comprise molecules having at least one aminoalkyl-containing end group. The aminoalkyl radical is typically located in an ortho position to the hydroxy group. Products containing such end groups can be obtained by incorporating an appropriate primary or secondary monoamine such as di-n-butylamine or dimethylamine as one of the constituents of the oxidative coupling reaction mixture. Also frequently present are 4-hydroxybiphenyl end groups, which typically can be obtained from reaction mixtures in which a by-product diphenoquinone is present, especially in a copper-halide-secondary or tertiary amine system. A substantial proportion of the polymer molecules, typically constituting as much as about 90% by weight of the polymer, can contain at least one of said aminoalkyl-containing and 4-hydroxybiphenyl end groups.

It will be apparent to those skilled in the art from the foregoing that poly(arylene ether) in the present nanocomposite can include all those presently known, irrespective of variations in structural units or ancillary chemical features. In certain embodiments, poly(arylene ether) resin can be present in about 5 weight percent (wt %) to 95 wt % based on the weight of the composition, specifically about 25 wt % to about 85 wt %, more specifically, 35 to 65 wt %, based on the weight of the composition.

Examples of various poly(phenylene ether) ethers include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly{2-(4'-methylphenyl)-1,4-phenylene ether), poly(2-bromo-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether) and poly(2,6-dimethyl-1,4-phenylene ether). Of these, poly(2,6-dimethyl-1,4-phenylene ether) is particularly preferable.

Moreover, there can be used not only a homopolymer of a phenolic compound but also a copolymer of two or more thereof. Further, the homopolymer and copolymer can be modified with a modifying agent such as maleic anhydride or fumaric acid. Also there can be used a graft copolymer or block copolymer of an aromatic compound such as styrene and any of the foregoing poly(phenylene ethers).

As indicated above, the nanocomposite can also comprise, as a thermoplastic polymer, in addition to the styrenic polymer in the polymeric nanoclay concentrate, a blended second polystyrenic polymer (or "styrenic polymer"). The blended second styrenic polymer use can be made of a polymer made by any of solution polymerization, bulk polymerization, suspension polymerization and bulk-suspension polymerization. As a monomer to be used as a starting material for the use is made of an aromatic vinyl compound represented by the above formula (I) above.

The blended second polystyrene can be a copolymer of the forgoing aromatic vinyl monomer and another vinyl monomer copolymerizable with at least one aromatic vinyl monomer or a rubbery polymer or oligomer. Specifically, the second styrenic polymer can contain at least 25% by weight of structural units derived from a monomer of formula (I) above.

Examples of the aromatic vinyl compounds represented by the general formula (1) include styrene, alpha-methylstyrene, methylstyrene, ethylstyrene, isopropylstyrene, tert-butylstyrene, phenylstyrene, vinylstyrene, high-impact polystyrene (HIPS), chlorostyrene, bromostyrene, fluorostyrene, chloromethylstyrene, methoxystyrene and ethoxystyrene. Specifically, styrene, p-methylstyrene, m-methylstyrene, p-tert-butylstyrene, p-chlorostyrene, m-chlorostyrene and p-fluorostyrene are included. Any of those can be used alone or in combination with at least one other.

Examples of an other vinyl monomers copolymerizable with the aromatic vinyl compound can include vinylcyanide compounds such as acrylonitrile and methacrylonitrile; acrylic esters such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate and benzyl acrylate; methacrylic esters such as methyl methacrylate, ethyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate and benzyl methacrylate; and maleimide based compounds such as maleimide, N-methyl maleimide, N-ethyl maleimide, N-butyl maleimide, N-lauryl maleimide, N-cyclohexyl maleimide, N-phenyl maleimide and N-(p-bromophenyl) maleimide.

Examples of rubbery polymers or oligomers copolymerizable with the aromatic vinyl compound can include polybutadiene, styrene-butadiene copolymer, acrylonitrile-butadiene copolymer, diene-based rubber such as polyisoprene, ethylene-alpha-olefin copolymer, ethylene-alpha-olefin-polyene copolymer, non-diene based rubber such as polyacrylic esters, styrene-butadiene block copolymer, hydrogenated styrene-butadiene block copolymer, ethylene-propylene elastomer, styrene-graft-ethylene-propylene elastomer, ethylenic ionomer resin and hydrogenated styrene-isoprene copolymer.

The weight average molecular weight of the polystyrene is not specifically limited but is generally at least 10,000, specifically at least 50,000 expressed in terms of weight average molecular weight. However, embodiments of polystyrene having a weight average molecular weight of less than 50,000 can be unfavorable because of deteriorated thermal and mechanical properties of the molding produced therefrom. Likewise, the molecular weight distribution thereof is not specifically limited in its wideness and narrowness, but various molecular weight distributions can be applicable thereto.

Further examples of thermoplastic resins in the present nanocomposite can include polyolefinic resins such as linear high density polyethylene, linear low density polyethylene, high pressure processed low density polyethylene, isotactic polypropylene, syndiotactic polypropylene, block polypropylene, random polypropylene, polybutene, 1,2-polybutadiene, cyclic polyolefin and poly-4-methylpentene; polyester based resin such as polycarbonate, polyethylene terephthalate and polybutylene terephthalate; polyamide based resin such as polyamide 6 and polyamide 6,6; polyarylene sulfide, any of which can be used alone or in combination with at least one other.

In some embodiments, additional polymers that can be included in the nanocomposite for blending with the polymeric nanoclay concentrate can include, specifically as a minor amount by weight with respect to the additional polymers, are the so-called block copolymers, for example, A-B-A triblock copolymers and A-B diblock copolymers. The A-B and A-B-A type block copolymer rubber additives which can be used are thermoplastic rubbers comprised of one or two alkenyl aromatic blocks which are typically styrene blocks and a rubber block, e.g., a butadiene block which can be partially hydrogenated. Mixtures of these triblock copolymers and diblock copolymers can be especially useful.

A-B and A-B-A type block copolymers are disclosed in, for example, U.S. Pat. Nos. 3,078,254, 3,402,159, 3,297,793, 3,265,765, and 3,594,452 and U.K. Patent 1,264,741. Examples of typical species of A-B and A-B-A block copolymers can include polystyrene-polybutadiene (SBR), polystyrene-poly(ethylene-propylene), polystyrene-polyisoprene, poly($\alpha$-methylstyrene)-polybutadiene, polystyrene-polybutadiene-polystyrene (SBS), polystyrene-poly(ethylene-propylene)-polystyrene, polystyrene-polyisoprene-polystyrene and poly($\alpha$-methylstyrene)-polybutadiene-poly($\alpha$-methylstyrene), as well as the hydrogenated versions thereof, and the like. Mixtures comprising at least one of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the trade name VECTOR, and Kuraray under the trademark SEPTON.

A useful amount of impact modifier can be less than or equal to 30 wt % based on the weight of the total nanocomposite composition, specifically greater than or equal to 5 wt % and less than or equal to 5 wt % based on the weight of the composition. In one embodiment, the impact modifier can comprise a polystyrene-polybutadiene-polystyrene block copolymer.

Moreover, in order to enhance the impact resistance of the nanocomposite, a rubbery elastomer can be used as part of and in combination with other polymers in the nanocomposite. Specific examples of usable rubbery elastomer include natural rubber, polybutadiene, polyisoprene, polyisobutylene, neoprene, polysulfide rubber, thiokol rubber, acrylic rubber, urethane rubber, silicone rubber, epichlorohydrin rubber, styrene-butadiene block copolymer (SBR), hydrogenated styrene-butadiene block copolymer (SEB, SEBC), styrene-butadiene-styrene block copolymer (SBS) hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), ethylene-propylene rubber (EPM), ethylene-propylene diene rubber (EPDM), core shell type granular elastomer such as butadiene-acrylonitrile-styrene-core shell rubber (ABS), methyl methacrylate-butadiene-styrene-core shell rubber (MBS), methyl methacrylate-butyl acrylate-styrene-core shell rubber (MAS), octyl acrylate-butadiene-styrene-core shell rubber (MABS), alkyl acrylate-butadiene-acrylonitrile-styrene-core shell rubber (AABS), butadiene-styrene-core shell rubber (SBR), siloxane-containing core shell rubber typified by methyl methacrylate-butyl acrylate-siloxane and rubber formed by modifying any of the foregoing rubber. Any of the above-exemplified rubbery elastomers can be used alone or in combination with at least one other rubbery elastomer.

The blended nanocomposite can also include effective amounts of at least one additive. Additives can include antioxidants; drip retardants; coating additives; dyes; pigments; colorants; nucleating agents; stabilizers; small particle minerals such as mica and talc; fibrous fillers; antistatic agents; plasticizers, lubricants; mold release agents; and mixtures comprising at least one of the foregoing additives. Effective amounts of the additives can vary widely, specifically present in an amount up to about 50% or more by weight, based on the weight of the entire composition. The nanocomposite compositions can further comprise such materials as thermal stabilizers, UV stabilizers, visual effect enhancers, extenders, catalyst quenchers, fire retardants, blowing agents, and processing aids. The different additives that can be incorporated into the present nanocomposites can include those that are commonly used in resin compounding and are known to those skilled in the art.

The fibrous filler can be any conventional filler used in polymeric resins to impart improved properties to polymeric composites and having an aspect ratio greater than 1. Such fillers can exist in the form of whiskers, needles, rods, tubes, strands, elongated platelets, lamellar platelets, ellipsoids, micro fibers, nanofibers and nanotubes, elongated fullerenes, and the like. Where such fillers exist in aggregate form, an aggregate can have an aspect ratio greater than 1. Examples of such fillers well known in the art include those described in "Plastic Additives Handbook, 5$^{th}$ Edition" Hans Zweifel, Ed, Carl Hanser Verlag Publishers, Munich, 2001. Non-limiting examples of fibrous fillers include short inorganic fibers, including processed mineral fibers such as those derived from blends comprising at least one of aluminum silicates, aluminum oxides, magnesium oxides, and calcium sulfate hemihydrate, boron fibers, ceramic fibers such as silicon carbide, and fibers from mixed oxides of aluminum, boron and silicon sold under the trade name NEXTEL® by 3M Co., St. Paul, Minn., USA. Also included among fibrous fillers are single crystal fibers or "whiskers" including silicon carbide, alumina, boron carbide, iron, nickel, copper. Fibrous fillers such as carbon fibers, glass fibers, basalt fibers, including textile glass fibers and quartz can also be included for purposes of this invention. Also included are natural organic fibers known to those skilled in the art such as cellulose.

In addition, organic reinforcing fibrous fillers and synthetic reinforcing fibers can be used in the present invention. This includes organic polymers capable of forming fibers such as polyethylene terephthalate, polybutylene terephthalate and other polyesters, polyarylates, polyethylene, polyvinylalcohol, polytetrafluoroethylene, acrylic resins, high tenacity fibers with high thermal stability including aromatic polyamides, polyaramid fibers such as Kevlar (product of Du Pont), polybenzimidazole, polyimide fibers such as polyimide 2080 and PBZ fiber (both products of Dow Chemical Company); and polyphenylene sulfide, polyether ether ketone, polyimide, polybenzoxazole, aromatic polyimides or polyetherimides, and the like. Combinations of any of the foregoing fibers can also be used.

Such reinforcing fillers can be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical co-woven structures include glass fiber-carbon fiber, carbon fiber-aromatic polyimide (aramid) fiber, and aromatic polyimide fiber-glass fiber. Fibrous fillers can be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids. In general the amount of fibrous filler present in the nanocomposite can range anywhere from about 0 to about 50 wt % based on the total weight of the composition, preferably from about 0 to about 20 wt % thereof.

There is no particular restriction on the types of flame retardants that can be used, except that the flame retardant is suitably stable at the elevated temperatures employed during processing and free of chlorine and bromine. Exemplary flame retardants include melamine (CAS No. 108-78-1), melamine cyanurate (CAS No. 37640-57-6), melamine phosphate (CAS No. 20208-95-1), melamine pyrophosphate (CAS No. 15541-60-3), melamine polyphosphate (CAS # 218768-84-4), melam, melem, melon, zinc borate (CAS No. 1332-07-6), boron phosphate, red phosphorous (CAS No. 7723-14-0), organophosphate esters, monoammonium phosphate (CAS No. 7722-76-1), diammonium phosphate (CAS No. 7783-28-0), alkyl phosphonates (CAS No. 78-38-6 and 78-40-0), metal dialkyl phosphinate, ammonium polyphosphates (CAS No. 68333-79-9), low melting glasses and combinations of two or more of the foregoing flame retardants.

In some embodiments, the composition comprises a flame retardant selected from the group consisting of an organophosphate ester, a metal dialkyl phosphinate, a nitrogen-containing flame retardant, metal hydroxides and mixtures of at least one of the foregoing flame retardants. In some embodiments, the flame retardant may be present in an amount of 0 to 35 weight percent (wt. %), with respect to the total weight of the composition. Within this range the amount of organophosphate ester can be greater than or equal to 5 wt. %, or more specifically, greater than or equal to 10 wt. %. Also within this range the amount of organophosphate ester can be less than or equal to 30 wt. %, or, more specifically, less than or equal to 25 wt. %.

Exemplary organophosphate ester flame retardants include, but are not limited to, phosphate esters comprising phenyl groups, substituted phenyl groups, or a combination of phenyl groups and substituted phenyl groups, bis-aryl phosphate esters based upon resorcinol such as, for example, resorcinol bis-diphenylphosphate, as well as those based upon bis-phenols such as, for example, bis-phenol A bis-diphenylphosphate. In one embodiment, the organophosphate ester is selected from tris(alkylphenyl) phosphate (for example, CAS No. 89492-23-9 or CAS No. 78-33-1), resorcinol bis-diphenylphosphate (for example, CAS No. 57583-54-7), bis-phenol A bis-diphenylphosphate (for example, CAS No. 181028-79-5), triphenyl phosphate (for example, CAS No. 115-86-6), tris(isopropylphenyl) phosphate (for example, CAS No. 68937-41-7) and mixtures of two or more of the foregoing organophosphate esters.

In one embodiment the organophosphate ester comprises a bis-aryl phosphate of Formula III:

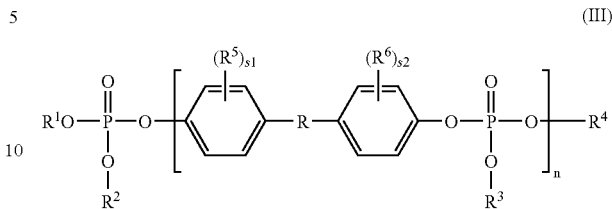

(III)

wherein R, $R^5$ and $R^6$ are independently at each occurrence an alkyl group having 1 to 5 carbons and $R^1$-$R^4$ are independently an alkyl, aryl, arylalkyl or alkylaryl group having 1 to 10 carbons; n is an integer equal to 1 to 25; and s1 and s2 are independently an integer equal to 0 to 2. In some embodiments $OR^1$, $OR^2$, $OR^3$ and $OR^4$ are independently derived from phenol, a monoalkylphenol, a dialkylphenol or a trialkylphenol.

As readily appreciated by one of ordinary skill in the art, the bis-aryl phosphate can be derived from a bisphenol. Exemplary bisphenols include 2,2-bis(4-hydroxyphenyl)propane (so-called bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In one embodiment, the bisphenol comprises bisphenol A.

Organophosphate esters can have differing molecular weights making the determination of the amount of different organophosphate esters used in the composition difficult. In one embodiment, the amount of phosphorus, as the result of the organophosphate ester, is 0.8 weight percent to 1.2 weight percent with respect to the total weight of the composition.

In some embodiments, the composition comprises a metal dialkyl phosphinate. As used herein, the term "metal dialkyl phosphinate" refers to a salt comprising at least one metal cation and at least one dialkyl phosphinate anion. In some embodiments, the metal dialkyl phosphinate has the formula

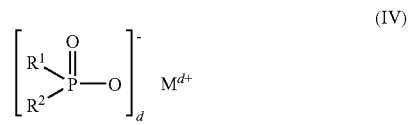

(IV)

wherein $R^1$ and $R^2$ are each independently $C_1$-$C_6$ alkyl; M is calcium, magnesium, aluminum, or zinc; and d is 2 or 3. Examples of $R^1$ and $R^2$ include methyl, ethyl, n-propyl, isopropyl, n-butyl, tert-butyl, n-pentyl, and phenyl. In some embodiments, $R^1$ and $R^2$ are ethyl, M is aluminum, and d is 3 (that is, the metal dialkyl phosphinate is aluminum tris(diethyl phosphinate)).

In some embodiments, the metal dialkyl phosphinate is in particulate form. The metal dialkyl phosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the metal dialkyl phosphinate may be combined with a polymer, such as a poly(arylene ether), a polyolefin, a polyamide, a block copolymer, or combination thereof, to form a masterbatch. The metal dialkyl phosphinate masterbatch comprises the metal dialkyl phosphinate in an amount greater than is present in the composition. Employing a masterbatch for the addition of the metal dialkyl phosphinate to the other components of the thermoplastic composition can facilitate addition and improve distribution of the metal dialkyl phosphinate.

In one embodiment, the flame retardant comprises a metal dialkyl phosphinate present in an amount of 0.5 to 20 weight percent (wt. %), with respect to the total weight of the composition. Within this range the amount of metal dialkyl phosphinate can be greater than or equal to 2 wt. %, or more specifically, greater than or equal to 5 wt. %. Also within this range the amount of organophosphate ester can be less than or equal to 15 wt. %, or, more specifically, less than or equal to 10 wt. %.

In some embodiments, the composition comprises a nitrogen-containing flame retardant comprising a nitrogen-containing heterocyclic base and a phosphate or pyrophosphate or polyphosphate acid. In some embodiments, the nitrogen-containing flame retardant has the formula

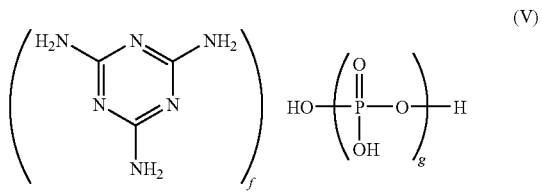

wherein g is 1 to about 10,000 and the ratio of f to g is about 0.5:1 to about 1.7:1, specifically 0.7:1 to 1.3:1, more specifically 0.9:1 to 1.1:1. It will be understood that this formula includes species in which one or more protons are transferred from the polyphosphate group to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to about 10,000, specifically about 5 to about 1,000, more specifically about 10 to about 500. In some embodiments in which the nitrogen-containing flame retardant is melamine polyphosphate, g has an average value of greater than 2 to about 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in International Patent Application No. WO 98/08898 A1 to Jacobson et al.

The nitrogen-containing flame retardant can have a low volatility relative to temperatures used to thermally cure the curable composition. For example, in some embodiments, the nitrogen-containing flame retardant can exhibit less than 1 percent weight loss by thermogravimetric analysis when heated at a rate of 20° C. per minute from 25 to 280° C., specifically 25 to 300° C., more specifically 25 to 320° C.

In one embodiment, the flame retardant comprises a nitrogen-containing flame retardant present in an amount of 0.5 to 20 weight percent (wt. %), with respect to the total weight of the composition. Within this range the amount of nitrogen-containing flame retardant can be greater than or equal to 2 wt. %, or more specifically, greater than or equal to 5 wt. %. Also within this range the amount of organophosphate ester can be less than or equal to 15 wt. %, or, more specifically, less than or equal to 10 wt. %.

In some embodiments, the composition may comprise metal hydroxides. Metal hydroxides can include all those capable of providing fire retardance, as well as combinations thereof. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardance. Exemplary metal hydroxides include, but are not limited to, magnesium hydroxide (for example, CAS No. 1309-42-8), aluminum hydroxide (for example, CAS No. 21645-51-2), cobalt hydroxide (for example, CAS No. 21041-93-0) and combinations of two or more of the foregoing. In some embodiments, the metal hydroxide comprises magnesium hydroxide. In some embodiments, the metal hydroxide has an average particle size less than or equal to 10 micrometers and/or purity greater than or equal to 90 weight percent. In some embodiments, it is desirable for the metal hydroxide to contain substantially no water, i.e., a weight loss of less than 1 weight percent upon drying at 120° C. for 1 hour. In some embodiments the metal hydroxide can be coated, for example, with stearic acid or other fatty acid.

The metal hydroxide can be present in an amount greater than or equal to 10, or, more specifically, greater than or equal to 15, or, even more specifically, greater than or equal to 20 weight percent based on the total weight of the composition. Also within this range the metal hydroxide can be present in an amount less than or equal to 30, or, more specifically, less than or equal to 25 weight percent based on the total weight of the composition.

In one embodiment, the composition is contains less than 0.1 weight percent polysiloxane, or, more specifically, less than 0.05 weight percent polysiloxane.

The flame retardant is present in at least the minimum amount necessary to impart a degree of flame retardancy to the composition to pass the desired UL-94 protocol. The particular amount will vary, depending on the molecular weight of the organic phosphate, the amount of the flammable resin present and possibly other normally flammable ingredients which might also be included in the composition.

The present nanocomposite blends can be prepared by methods known to those skilled in the art. In a specific embodiment, a nanocomposite can be prepared by melt mixing in a suitable mixing instrument capable of heating to melt temperatures of the polymers in the blend. In one embodiment, the mixing is done in a double-screw extruder mixer in a temperature range from about 180° C. to about 350° C., more specifically from about 225° C. to about 300° C., and most specifically from about 240° C. to about 270° C.

In one embodiment, a poly (arylene ether)/polystyrene blend is produced by a method comprising, in a first step, forming a first mixture comprising a poly(arylene ether) resin and optional impact modifier by intimately mixing in melt; and, in a second step, forming a nanocomposite that comprises nanoclay dispersed in a poly(arylene ether)/polystyrene matrix by intimately mixing the first mixture with a styrenic nanoclay concentrate. In a specific embodiment, the first step is performed in a first extruder and the second step is performed in a second extruder.

The nanocomposites exhibit excellent molding performance and excellent properties at various thicknesses while maintaining desirable heat stability.

In one embodiment, the nanocomposite, in the form of test specimens of the nanocomposite prepared by injection molding can exhibit, a heat deflection temperature according to ASTM D638 and the tensile modulus according to ASTM D618 and flexural modulus according to ASTM D790 that is improved by at least ten percent compared to the composition without the nanoclay. Furthermore, the heat deflection temperature according to ASTM D648, Method B, is higher compared to the composition without the nanoclay.

In one specific embodiment comprising poly(ethylene oxide) as the main polymer in the nanocomposite, test specimens of the nanocomposite prepared by injection molding can exhibit a flexural modulus of greater than or equal to 3500 MPa, specifically greater than or equal to 3600 MPa according to ASTM standard according to ASTM D790; a tensile modulus of greater than or equal to 3500 MPa, specifically greater than or equal to 3600 MPa according to ASTM standard D638; a Tg of greater than or equal to 150° C.; and an heat deflection temperature of greater than or equal to 139° C., specifically greater than or equal to 142° C. according to ASTM standard D648.

The nanocomposite polymer compositions of the present invention can be formed into articles by conventional plastic processing techniques. Molded articles can be made by compression molding, blow molding, injection molding or such molding techniques known to those skilled in the art. Articles prepared from the nanocomposites of the present invention include, but are not limited to film, sheet, pipes, tubes, profiles, molded articles, performs, stretch blow molded films and containers, injection blow molded containers, extrusion blow molded films and containers, thermoformed articles and the like. Articles prepared from the compositions of the present invention can be used in applications that require materials with low glass transition temperature and high heat resistance such as automotive applications.

In one embodiment, the present invention provides an article comprising at least one nanocomposite polymer composition, wherein said composition is as described above, wherein said article is an automotive part. Automotive parts are exemplified by body panels, quarter panels, rocker panels, trim, fenders, doors, deck lids, trunk lids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, running boards, electrical components, and connectors, to name a few specific embodiments.

The invention includes at least the following embodiments:

Embodiment 1

A composition for a polymeric nanoclay concentration comprising: a styrenic polymer in an amount of greater than or equal to 70 percent and less than or equal than 95 percent, based on total weight of composition; a nanoclay in an amount of greater than or equal to 5 percent and less than or equal to 30 percent, based on total weight of composition; an emulsifier compound in an amount of 1 to 10 percent, based on total weight of composition; wherein the nanoclay has been substantially untreated with respect to cation exchange; and where the nanoclay comprises particles that are exfoliated in a polymeric matrix comprising the styrenic polymer.

Embodiment 2

The composition of embodiment 1 wherein the emulsifier compound is an organic salt compound comprising an anionic substituent covalently bonded to an organic moiety and a cationic counter ion.

Embodiment 3

The composition of embodiment 1 or 2 wherein the emulsifier compound is a $C_4$ to $C_{30}$ organic sulfonate compound.

Embodiment 4

The composition of any of embodiments 1-3 further comprising a residual amount of a coagulating agent.

Embodiment 5

The composition of embodiment 4 wherein the coagulating agent is calcium chloride.

Embodiment 6

The composition of any of embodiments 1-5 wherein the styrenic polymer was obtained by emulsion polymerization in the presence of an aqueous dispersion of the nanoclay and emulsifier compound to form a dispersed aqueous mixture of the nanoclay and styrenic polymer, which mixture was coagulated to obtain the polymeric nanoclay concentrate.

Embodiment 7

The composition of any of embodiments 1-6 wherein the nanoclay comprises platelets of a layered silicate.

Embodiment 8

The composition of embodiment 7 wherein the layered silicate is selected from the group consisting of montmorillonite, hectorite, saponite, hectorite, mica, vermiculite, bentonite, nontronite, beidellite, volkonskoite, magadite, kenyaite, and mixtures comprising at least one of the foregoing layered silicates.

Embodiment 9

The composition of any of embodiments 1-8 wherein the styrenic polymer contains at least 25 weight percent of structural units derived from a monomer represented by the following structure:

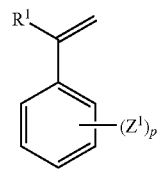

wherein $R^1$ is hydrogen, lower alkyl having from 1 to 7 carbon atoms, or halogen; $Z^1$ is vinyl, halogen or lower alkyl having from 1 to 7 carbon atoms; and p is from 1 to 5.

Embodiment 10

The composition of any of embodiments 1-9 where the styrenic polymer is a homopolymer of styrene, chlorostyrene, or vinyltoluene, or a random copolymer comprising styrene and one or more monomers selected from the group consisting of acrylonitrile, butadiene, alpha-methylstyrene, ethylvinylbenzene, divinylbenzene, maleic anhydride, and $C_1$ to $C_4$ alkyl esters of acrylate or methacrylate.

Embodiment 11

The composition of any of embodiments 1-10 wherein, in the polymeric nanoclay concentrate, the nanoclay is present in an amount of greater than or equal to 8 percent and less than or equal to 24 percent, by weight of total composition, and the styrenic polymer is present in an amount of greater than or equal to 76 percent and less than or equal than 92 percent, by weight of composition.

Embodiment 12

A composition comprising: a styrenic polymer; a nanoclay; an additional polymer; and an emulsifier compound in a residual amount of at least 500 ppm, based on total weight of the composition; wherein the nanoclay comprises particles that are exfoliated in a polymeric matrix comprising the styrenic polymer and the additional polymer.

Embodiment 13

The composition of embodiment 12 wherein the additional polymer comprises poly(phenylene ether).

Embodiment 14

The composition of embodiments 12 or 13 wherein the composition has a tensile modulus according to ASTM D618 and a flexural modulus according to ASTM D790 that are improved by at least ten percent compared to the composition without the nanoclay.

Embodiment 15

The composition of any of embodiments 12-14 wherein the heat deflection temperature according to ASTM D648, Method B, is higher compared to the composition without the nanoclay.

Embodiment 16

The composition of any of embodiments 12-15 wherein test specimens of a nanocomposite prepared by injection molding the composition has a flexural modulus of greater than or equal to 3500 MP according to ASTM D790; a tensile modulus of greater than or equal to 3500 MPa according to ASTM D638; a Tg of greater than or equal to 150° C.; and a heat deflection temperature of greater than or equal to 139° C. according to ASTM D648.

Embodiment 17

The composition of any of embodiments 12-16 wherein the exfoliated nanoclay comprises residual platelets characterized by a mean interlayer distance of at least 1.40 nm as determined by X-ray diffraction.

Embodiment 18

The composition of any of embodiment 12-17 wherein the emulsifier compound is an organic salt compound, comprising an anionic substituent covalently bonded to an organic moiety, and a cationic counter ion.

Embodiment 19

The composition of any of embodiments 12-18 wherein the emulsifier compound is a $C_4$ to $C_{30}$ organic sulfonate compound.

Embodiment 20

The composition of any of embodiments 12-19 wherein the nanoclay is not an organoclay.

Embodiment 21

The composition of any of embodiments 12-20 wherein the nanoclay has been substantially untreated with an organic quaternary ammonium salt or quaternary amine-bearing vinyl functionality.

Embodiment 22

The composition of any of embodiments 12-21 wherein the nanoclay comprises platelets of a layered silicate.

Embodiment 23

The composition of embodiment 22 wherein the layered silicate is selected from the group consisting of montmorillonite, hectorite, saponite, hectorite, mica, vermiculite, bentonite, nontronite, beidellite, volkonskoite, magadite, kenyaite, and combinations thereof.

Embodiment 24

The composition of any of embodiments 12-23 wherein the styrenic polymer contains at least 25 weight percent of structural units derived from a monomer represented by the following structure:

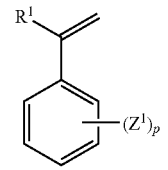

wherein $R^1$ is hydrogen, lower alkyl having from 1 to 7 carbon atoms, or halogen; $Z^1$ is vinyl, halogen, or lower alkyl having from 1 to 7 carbon atoms; and p is from 1 to 5.

Embodiment 25

The composition of any of embodiments 12-24 where the styrenic polymer is a homopolymer of styrene, chlorostyrene, or vinyltoluene, or a random copolymer comprising styrene and one or more monomers selected from the group consisting of acrylonitrile, butadiene, alpha-methylstyrene, ethylvinylbenzene, divinylbenzene, maleic anhydride, and $C_1$ to $C_4$ alkyl esters of acrylate or methacrylate.

Embodiment 26

The composition of any of embodiments 12-25 wherein the mean diameter of the particles of nanoclay is about 50 to 500 nm.

Embodiment 27

The composition of embodiment 26 wherein the diameter of the particles exhibits a Log normal distribution.

Embodiment 28

The composition of any of embodiments 12-27 wherein the additional polymer comprises a hydrophobic or hydrophilic polymer that has been miscibly blended with the styrenic polymer in the composition to form a polymeric continuous phase in which particles of the nanoclay are dispersed.

Embodiment 29

The composition of any of embodiments 12-28 wherein the additional polymer comprises a polymer that is dispersed within the styrenic polymeric phase mixed with the particles of the nanoclay.

Embodiment 30

The composition of any of embodiments 12-28 wherein the additional polymer comprises a polymer selected from the group consisting of poly(arylene ether)s, polyamides, polyesters, polyolefins, and a second styrenic polymer.

Embodiment 31

The composition of any of embodiments 12-28 wherein the additional polymer comprises a second styrenic polymer selected from the group consisting of polystyrene homopolymers, high-impact polystyrene, halogenated polystyrenes, styrene-maleic anhydride copolymers, acrylonitrile-butadiene-styrene copolymers, styrene-acrylonitrile copolymers, poly-alpha-methylstyrenes, and mixtures thereof.

Embodiment 32

The composition of any of embodiments 12-31 wherein the weight ratio of the styrenic polymer to the total additional polymer in the composition is 1:15 to 10:1.

Embodiment 33

The composition of any one of embodiments 12-28 wherein the additional polymer comprises a thermoplastic polymer that is a rubbery or elastomeric polymer.

Embodiment 34

The composition of embodiment 33 wherein the rubbery or elastomeric polymer comprises a diene-based rubber.

Embodiment 35

The composition of any of embodiments 12-28 wherein the additional polymer comprises a thermoplastic polymer selected from the group consisting of styrene-butadiene copolymer, acrylonitrile-butadiene copolymer, ethylene-α-olefin copolymer, ethylene-α-olefin-polyene copolymer, polyacrylic ester, styrene-butadiene block copolymer (SB), styrene-butadiene-styrene block copolymer (SBS), styrene-isoprene block copolymer (SI), styrene-isoprene-styrene block copolymer (SIS), hydrogenated styrene-butadiene block copolymer (SEB), hydrogenated styrene-butadiene-styrene block copolymer (SEBS), ethylene-propylene elastomer, ethylene-graft-ethylene-propylene elastomer, ethylenic ionomer resin, hydrogenated styrene-isoprene block copolymer (SEP), hydrogenated styrene-isoprene-styrene block copolymer (SEPS), poly(butadiene), poly(butyl acrylate), and mixtures thereof.

Embodiment 36

The composition of any of embodiments 12-28 wherein the additional polymer comprises a thermoplastic polymer comprising one or more impact modifiers selected from the group consisting of ABA triblock copolymers and AB diblock copolymers.

Embodiment 37

A composition made by the process of: obtaining a polymeric nanoclay concentrate, comprising nanoclay in a styrenic polymer, obtained by coagulating a mixture of nanoclay and the styrenic polymer, in the form of a latex, wherein the styrenic polymer has been formed by emulsion polymerization in the presence of an aqueous dispersion of nanoclay and emulsifier compound, wherein the nanoclay in the nanocomposite is not an organoclay, has not been treated with a compound bearing a vinyl functionality, and is selected from the group consisting of montmorillonite, hectorite, saponite, hectorite, mica, vermiculite, bentonite, nontronite, beidellite, volkonskoite, magadite, and kenyaite; wherein the polymeric nanoclay concentrate comprises nanoclay in an amount of greater than or equal to 5 percent and less than or equal to 30 percent, by weight of total composition, and styrenic polymer in an amount of greater than or equal to 70 percent and less than or equal than 95 percent, by weight of total composition; melt blending the polymeric nanoclay concentrate with an additional polymer to obtain a nanocomposite, wherein the additional polymer comprises a major amount of a poly(phenylene oxide) polymer, based on the total weight of polymers in the nanocomposite; wherein the nanoclay in the nanocomposite comprises particles of nanoclay exfoliated in a polymeric matrix comprising the styrenic polymer and the additional polymer; wherein the nanocomposite comprises nanoclay in an amount of greater than or equal to 2 percent and less than or equal to 10 percent, by weight of total composition, and total polymer in an amount of greater than or equal to 90 percent and less than or equal than 98 percent, by weight of total composition; and wherein test specimens of the nanocomposite prepared by injection molding has a flexural modulus of greater than or equal to 3500 MP according to ASTM D790; a tensile modulus of greater than or equal to 3500 MPa according to ASTM D638; a Tg of greater than or equal to 150° C.; and a heat deflection temperature of greater than or equal to 139° C. according to ASTM D648.

Embodiment 38

The composition of embodiment 37 wherein the emulsifier compound is present in an amount of 1 to 10 percent, by weight total composition, in the polymeric nanoclay concentrate.

Embodiment 39

A process of obtaining a polymeric nanoclay concentrate, the process comprising: emulsion polymerizing a reaction mixture comprising styrenic monomers in the presence of an aqueous dispersion of nanoclay and emulsifier compound, wherein an aqueous mixed dispersion comprising styrenic polymer and the nanoclay is formed; coagulating the aqueous mixed dispersion with a coagulating agent to form a coagulated mixed dispersion comprising nanoclay and styrenic polymer; and solidifying the coagulated mixed dispersion to form a polymeric nanoclay concentrate comprising nanoclay and the styrenic polymer as a carrier resin; wherein the nanoclay has been substantially untreated with respect to cation exchange; and wherein the styrenic polymer is present in an amount of greater than or equal to 70 percent and less than or equal than 95 percent, by weight of total composition; and the nanoclay is present in an amount of greater than or equal to 5 percent and less than or equal to 30 percent, by weight of total composition; and wherein the nanoclay in the polymeric nanoclay concentrate is exfoliated in a polymeric matrix comprising the styrenic polymer.

Embodiment 40

The process of embodiment 39 wherein, in the polymeric nanoclay concentrate, the nanoclay is present in an amount of greater than or equal to 8 percent and less than or equal to 24 percent, by weight of total composition, and the styrenic polymer is present in an amount of greater than or equal to 76 percent and less than or equal than 92 percent, by weight of total composition.

Embodiment 41

The process of any of embodiments 39-40 wherein the coagulating agent comprises an inorganic salt.

Embodiment 42

The process of any of embodiments 39-41 wherein the coagulating agent comprises calcium chloride.

Embodiment 43

The process of any of embodiments 39-42 wherein the nanoclay is not an organoclay.

Embodiment 44

The process of any of embodiments 39-43 wherein the nanoclay comprises particles from a layered silicate selected from the group consisting of montmorillonite, hectorite, and saponite.

Embodiment 45

The process of embodiment any of embodiments 39-44 wherein: the emulsion polymerization comprises dispersing nanoclay in an aqueous carrier, subjecting the nanoclay to mixing and heating until particles of the nanoclay have swollen and dispersed, forming a viscous solution, and dripping a feed of the reaction mixture, comprising styrenic monomer and initiator, into the aqueous dispersion of nanoclay to form emulsion particles of the styrenic polymer; The coagulation comprises dripping the aqueous mixed dispersion of nanoclay and styrenic polymer into a coagulate solution that has been heated, wherein a slurry is obtained; and the solidification comprises filtering the slurry under vacuum to obtain a wet cake, optionally reslurrying and refiltering, and drying the wet cake under vacuum.

Embodiment 46

A process of obtaining a nanocomposite comprising: emulsion polymerizing a reaction mixture comprising styrenic monomers in the presence of an aqueous dispersion of nanoclay and emulsifier compound, wherein an aqueous mixed dispersion comprising styrenic polymer and the nanoclay is formed; coagulating the aqueous mixed dispersion with a coagulating agent to form a coagulated mixed dispersion comprising nanoclay and styrenic polymer; solidifying the coagulated mixed dispersion to form a polymeric nanoclay concentrate comprising nanoclay and the styrenic polymer as a carrier resin; and melt mixing the polymeric nanoclay concentrate with an additional polymer to form a nanocomposite; wherein the nanoclay in the nanocomposite is exfoliated in a polymeric matrix comprising the styrenic polymer and additional polymer.

Embodiment 47

The process of embodiment 46 wherein the exfoliated nanoclay comprises residual platelets characterized by a mean interlayer distance of at least 1.40 nm as determined by X-ray diffraction.

Embodiment 48

The process of any of embodiments 46-47 wherein the polymeric nanoclay concentrate is melt compounded with an additional polymer using an extruder.

Embodiment 49

The process of any of embodiments 46-48 wherein, in the polymeric nanoclay concentrate, the nanoclay is present in an amount of greater than or equal to 5 percent and less than or equal to 30 percent, by weight of total composition, and the styrenic polymer is present in an amount of greater than or equal to 70 percent and less than or equal than 95 percent, by weight of total composition; and wherein, in the nanocomposite that is produced, the nanoclay is present in an amount of greater than or equal to 1 percent and less than or equal to 10 percent, by weight of total composition, and the total polymer is present in an amount of greater than or equal to 90 percent and less than or equal than 99 percent, by weight of total composition in the nanocomposite.

Embodiment 50

The process of any of embodiments 46-49 wherein the coagulating agent comprises an inorganic salt.

Embodiment 51

The process of any of embodiments 46-50 wherein the coagulating agent comprises calcium chloride.

Embodiment 52

The process of any of embodiments claim 46-51 wherein the nanoclay is not an organoclay.

Embodiment 53

The process of any of embodiments 46-52 wherein the nanoclay comprises particles from a layered silicate selected from the group consisting of montmorillonite, hectorite, and saponite.

Embodiment 54

The process of any of embodiments 46-53 wherein: the emulsion polymerization comprises dispersing nanoclay in an aqueous carrier, subjecting the nanoclay to mixing and heating until particles of the nanoclay have swollen and dispersed, forming a viscous solution, and dripping a feed of the reaction mixture, comprising styrenic monomer and initiator, into the aqueous dispersion of nanoclay to form emulsion particles of the styrenic polymer; the coagulation comprises dripping the mixed aqueous dispersion of nanoclay and styrenic polymer into a coagulate solution that has been heated, wherein a slurry is obtained; the solidification comprises filtering the slurry under vacuum to obtain a wet cake, optionally reslurrying and refiltering, and drying the wet cake under vacuum; and mixing comprises melt blending the polymeric nanoclay concentrate with an additional polymer in an extruder, wherein the additional polymer comprises poly(phenylene ether).

Embodiment 55

An article comprising the composition of any of embodiments 1-54.

Embodiment 56

The article of embodiment 55 made by a process selected from the group consisting of extrusion, injection molding, thermoforming, compression molding, and combinations of at least one of the foregoing processes.

EXAMPLES

A. Materials and Methods

Potassium dodecyl benzene sulfonate (KDDBS), sodium lauryl sulfate (SLS), styrene monomer (ST), potassium persulfate (KPS), n-dodecyl mercaptan nDDM) and calcium chloride ($CaCl_2$) were purchased from Sigma-Aldrich and used as received. A sample of the Empol 1018, a C36 dimer acid, was obtained from the Cognis Corp. CLOISITE Na+ nanoclay and CLOISITE 20A nanoclay were purchased from Southern Clay. Demineralized water (DMW) is generated by Ion-exchange in the laboratory. PPE (poly(phenylene ether)) resin of standard molecular weight (0.46 intrinsic viscosity (IV)) was obtained from SABIC Innovative Plastics, and Blendex 865 PS polystyrene resin of Mw about 1,000,000 and 2,000,000 g/mol was obtained from Chemtura high-impact polystyrene (HIPS) modified with approximately 10% by weight poly(butadiene) rubber was obtained from SABIC Innovative Plastics, and unmodified crystal polystyrene (XPS) was obtained from Chevron; the pellets of these two polystyrenes were ground into fine powders before use in order to facilitate preparation of a uniform blend with the PPE resin and emulsion polystyrenes.

The final pH of the PS (polystyrene) latex particles was measured using a benchtop pH meter. The particle size distribution (PSD) of the polystyrene latex particles was measured using a Beckman-Coulter® LS230 multi-angle laser light scattering instrument. The residual styrene was measured using standard gas chromatography. The molecular weight of the emulsion polystyrene was measured using standard gel permeation chromatography (GPC), using $CHCl_3$ as solvent, PS standard, and RI detector. The glass transition temperature (Tg) of the polystyrene reaction products and extruded blends were measured by differential scanning calorimetry (DSC). The interlayer spacing and ordering of the nanoclay in the various polymer matrices was characterized by small-angle X-ray scattering (SAXS) and X-ray diffraction (XRD). The combination of TEM and X-ray diffraction methods is considered to be the best practice for assessment of the morphology of PLSNCs (polymer-layered silicate nanocomposites), since characterization spans the size range of 1-20 nm for individual interlayer stacking to 200-500 nm for platelet length and tactoid cross-section to micrometers for overall dispersion and orientation of clay tactoids. See "Assessing Organo-Clay Dispersion in Polymer Nanocomposites," Deborah F. Eckel, Michael P. Balogh, Paula D. Fasulo, William R. Rodgers Journal of Applied Polymer Science 93 (2004) 1110-1117; "Characterization of Polymer-Layered Silicate (Clay) Nanocomposites by Transmission Electron Microscopy and X-Ray Diffraction: A Comparative Study" Alexander B. Morgan, Jeffrey W. Gilman Journal of Applied Polymer Science 87 (2003) 1329-1338.

The sampling plan, image acquisition and analysis of nanoclay platelet distribution by Transmission Electron Microscopy (TEM) are as follows. One ASTM Type I tensile bar per sample is investigated by sectioning across the center of the bar and in areas plus/minus 2 cm from the center: these 3 areas were labeled B, M and T. The samples are examined without staining and the thickness of the section is on the order of 80 nm. At least 5 images are acquired at each location (B, M, T) at a magnification of 59,000× with a Tecnai® G2 TEM operated at 120 kV. Nanoclay platelets that present themselves edge-on to the electron beam are visualized as dark lines in the digital images and used as the basis for calculating the distribution of platelet diameters.

The image analysis is conducted using the Clemex® Vision PE 5.0 software. After calibrating each digital image to the appropriate length scale, the length of each platelet represented by the dark lines in the TEM image is manually traced directly into the image analysis software by use of the mouse cursor. The software automatically compiles the data and returns the statistical information about the length distribution as the mean, standard deviation, and observation count for each image. The length data from all the images (15 minimum) are compiled to calculate the platelet length distribution for each sample.

ASTM test specimens of blends in the examples below were prepared by injection molding on a 40T Boy molding machine at a melt temperature of 300-325° C. and a mold temperature of 76° C. The tensile, flexural, heat resistance properties, and Notched Izod impact strength were measured following ASTM test procedures: tensile properties by the test method of ASTM D638; heat deflection temperature under flexural load by the test method of ASTM D648; flexural properties by the test method of ASTM D790; analysis of thermal transition in plastics (Tg and Tm) by ASTM D3418; and Notched Izod Impact Strength by ASTM D256.

Thin films of the styrenic compositions were prepared by pressing a small amount of powder between sheets of Mylar film at a temperature of 200° C. and a pressure of 350 bar for 15 seconds.

Unless indicated otherwise, all percents are by weight of total composition.

B. Preparation of Nanoclay/Polystyrene Latex Composite

The recipes for the emulsion polymerization of polystyrene used to prepare the nanoclay/polystyrene latex composite are shown in Table 1, expressed in parts, along with the characterization data for the lattices.

TABLE 1

| | Concentrate | | | | | | | | |
|---|---|---|---|---|---|---|---|---|---|
| | C-2 | 4 | 5 | C-8 | 6 | 10 | C-11 | 7 | 9 |
| Soap | Dimer Acid Na$^+_2$ salt | Dimer Acid Na$^+_2$ | Dimer Acid Na$^+_2$ | KDDBS | KDDBS | KDDBS | SLS | | SLS |
| Target % Clay in resin | 0 | 10 | 20 | 0 | 10 | 20 | 0 | 10 | 20 |
| Recipe in Parts | | | | | | | | | |
| DMW | 540 | 540 | 540 | 540 | 540 | 540 | 540 | 540 | 540 |
| 10% soap solution | | | | | | | | | |
| Dimer Acid Na$^+_2$ salt | 2.5 | 2.5 | 2.5 | | | | | | |
| SLS | | | | | | | 2.5 | 2.5 | 2.5 |
| KDDBS | | | | 3.0 | 3.0 | 3.0 | | | |
| DMW | 22.5 | 22.5 | 22.5 | 27.0 | 27.0 | 27.0 | 22.5 | 22.5 | 22.5 |
| 50% NaOH solution | 0.4 | 0.4 | 0.4 | | | | | | |
| CLOISITE Na + Clay | 0.0 | 11.1 | 25.0 | 0.0 | 11.1 | 25.0 | 0.0 | 11.1 | 25.0 |
| 3% KPS in DMW | | | | | | | | | |
| KPS | 1.0 | 1.0 | 1.0 | 1.0 | 1.0 | 1.0 | 1.0 | 1.0 | 1.0 |
| DMW | 32.3 | 32.3 | 32.3 | 32.3 | 32.3 | 32.3 | 32.3 | 32.3 | 32.3 |
| Styrene | 100 | 100 | 100 | 100 | 100 | 100 | 100 | 100 | 100 |
| Total Parts in Recipe | 698.7 | 709.8 | 723.7 | 703.3 | 714.4 | 728.3 | 698.3 | 709.4 | 723.3 |
| Theory % final solids | 14.84 | 16.17 | 17.78 | 14.79 | 16.11 | 17.71 | 14.82 | 16.15 | 17.77 |
| PS Latex. nm | 79 | 84 | — | 84 | 79 | 73 | 95 | 84 | 73 |
| Resid ST monomer, ppm | 191 | 41 | — | 502 | 539 | 696 | 444 | 508 | 487 |
| Final Dispersion pH | 11.0 | 10.5 | 9.9 | 7.1 | 7.1 | 2.4 | 7.5 | 7.6 | 2.5 |
| Final Dispersion % solids | 14.62 | 15.82 | 16.98 | 15.59 | 15.54 | 14.50 | 16.30 | 16.98 | 14.55 |

The recipes shown in Table 1 were calculated on a basis of 100 parts of styrene monomer, and a charge factor of 3 was applied to the recipes to calculate the charges in grams that were made to the 3-liter reactor. An initial portion of 333 parts (1,000 g) of the total DMW is charged to the reactor, followed by the required amount of emulsifier compound added as a 10% by weight solution in DMW. The SLS and KDDBS were used and dissolved in DMW as received. The dimer acid was first saponified by reaction of 9.28 parts of acid with 2.89 parts of NaOH in 89.3 parts of DMW. The pH of the initial reactor charge of dimer soap plus DMW was further adjusted by addition of 0.4 parts of 50% NaOH solution in order to maintain a basic final pH. The water circulator for the reactor jacket is set at a temperature that brings the reactor batch temperature to 70° C. and the agitation is set at 300 rpm. The reactor is equipped with a single agitator having 4 blades pitched at 45 degrees and a thermocouple dipped into the liquid for measuring the batch reaction temperature.

The required amount of CLOISITE Na$^+$ clay powder is charged slowly through a funnel into the stirred mixture of DMW and soap. Any remaining clay particles are rinsed into the reactor with the remaining parts of DMW. The clay-DMW-soap slurry is agitated and heated at 70° C. for approximately 3.5 hours, at which time the nanoclay has swollen and dispersed to form a viscous brown solution. A sample withdrawn from the reactor at this time looks uniform, but some white crystalline solid will settle out upon standing.

The required amount of styrene is weighed out and charged to a graduated dropping funnel. A 3% solution of KPS in DMW is prepared by stirring for 10 minutes at room temperature, then charged to the reactor and stirred for 5 minutes. The styrene monomer feed is commenced by dripping the feed into the reactor at a rate sufficient to complete the charge in about one hour.

The batch temperature will rise a few degrees as the polystyrene polymerization commences, and the reactor contents turns a milky white due to formation of the polystyrene emulsion particles.

After completion of the styrene monomer feed, the reactor contents are stirred for an additional 2 hours at 70° C. followed by 1 hour at 80° C. in order to complete the decomposition of the KPS and conversion of styrene. The resulting latex is cooled to about 60° C. and discharged into a glass jar. Samples of the final latex are analyzed for pH, emulsion particle size and residual styrene monomer. The reaction conversion was estimated by measuring the percent solids of latex samples withdrawn at the end of the 1-hour monomer feed and at the end of reaction by carefully drying approximately 2 grams of latex in a vacuum oven at 110° C.

C. Isolation of Nanoclay-Polystyrene Composite Resin

Quantitative recovery of the polystyrenic nanoclay concentrate was carried out via coagulation in a 1-liter beaker equipped with a heating mantle, thermocouple probe and electronic temperature control. A 4-bladed pitched metal agitator was used at 600 rpm.

For purposes of establishing the mass balance of the coagulation process, the required amount of coagulant in DMW is charged to the 1-liter beaker and heated to about 92° C. whilst stirring at 600 rpm. A glass separatory funnel is charged with 250.0 grams of nanoclay-polystyrene composite latex, which is slowly dripped into the hot coagulant solution at such a rate to maintain the slurry temperature at a minimum of 85° C., typically over 30 minutes. The slurry is filtered through paper using vacuum. The wet cake is transferred back to the 1-liter beaker and re-slurried in 300 g of DMW whilst stirring at 600 rpm and heating to 80° C. The slurry is again filtered under vacuum, taking care to rinse all particles of coagulated resin into the filter. The wet cake resin is placed in a tared aluminum pan and dried to constant weight in a vacuum oven set at 90° C.

In the case of reactions 2, 4 and 5 based on the dimer acid the coagulation medium is a 500 ml solution of 0.05% $H_2SO_4$; for the other reactions based on either SLS or KDDBS the coagulation medium is a solution of 2.1 g of $CaCl_2$ in 500 ml of DMW. The mass of the dried resins is compared to that calculated from the 250 g mass of latex times the percent solids measured on the latex to calculate the percent yield of polystyrenic nanoclay concentrate. For isolation of the entire reaction mass by salt coagulation, the 3-liter reactor vessel, agitator and water jacket circulator was employed. A solution of 8.5 g of $CaCl_2$ in 1300 g of tap water is charged to the reactor and stirred at 700 rpm in order to create a strong vortex in the liquid, and the water bath circulator is set at 98° C. The emulsion reactions were coagulated in two portions of roughly 1,050 g each by dripping the latex onto the vortex wall of the hot, stirred $CaCl_2$ solution at such a rate as to maintain a slurry temperature of at least 91.5° C.

centrates 4 and 5 by acid coagulation shows a trend to lesser recovery as the percentage of nanoclay charged to the reactor is increased. In contrast, the recovery of polystyrenic nanoclay concentrate for concentrates 6-10 by salt coagulation is on the order of 99% by weight or greater. These results suggest that a significant portion of the CLOISITE $Na^+$ nanoclay, on the order of about 25%, is being lost during coagulation with sulfuric acid and not being completely trapped in the coagulated polystyrene resin.

TABLE 2

| | Reaction | | | | | | | | |
|---|---|---|---|---|---|---|---|---|---|
| | 2 | 4 | 5 | 6 | 7 | 8 | 9 | 10 | 11 |
| Soap | Dimer Acid $Na^+_2$ salt | Dimer Acid $Na+_2$ salt | Dimer Acid $Na+_2$ salt | KDDBS | SLS | KDDBS | SLS | KDDBS | SLS |
| Clay in PS | 0 | 10 | 20 | 10 | 10 | 0 | 20 | 20 | 0 |
| Expected weight | 36.6 | 39.5 | 42.4 | 39.0 | 38.9 | 36.3 | 40.8 | 42.5 | 36.4 |
| Coagulant | $H_2SO_4$ | $H_2SO_4$ | $H_2SO_4$ | $CaCl_2$ | $CaCl_2$ | $CaCl_2$ | $CaCl_2$ | $CaCl_2$ | $CaCl_2$ |
| Wt dry resin | 36.1 | 37.4 | 38.7 | 38.5 | 38.7 | 36.0 | 40.5 | 42.1 | — |
| Dry resin yield | 98.8% | 94.6% | 91.2% | 98.8% | 99.6% | 99.3% | 99.4% | 99.2% | — |
| GPC $M_n$ | — | 61,217 | 65,081 | 58,970 | 52,213 | 39,101 | 55,505 | 57,010 | — |
| GPC $M_w$ | — | 406,950 | 405,360 | 409,343 | 380,923 | 330,127 | 382,777 | 380,440 | — |
| DSC Onset Tg | 99.4 | 103.8 | 104.1 | 104.3 | 103.2 | 103.1 | 103.6 | 105.1 | — |

(roughly 45 minutes). After the addition of latex is complete the slurry is heated with stirring to 94° C., then discharged into a 3-liter beaker and filtered under vacuum through a filter funnel equipped with a coarse glass frit. A 1,000 g portion of tap water is immediately charged to the coagulation vessel and reheated to about 60° C. with stirring to rinse out remaining particles of resin, and this warm solution is used to re-slurry the wet cake in the filter funnel before a second vacuum filtration. The wet resin cake dried under vacuum with a nitrogen bleed at 85° C. to constant weight.

D. Results

Referring to the recipes for the polystyrenic nanoclay concentrates shown in Table 1 above, concentrates 2, 8 and 11 are control reactions of emulsion PS prepared in the absence of nanoclay, and the resulting lattices were white, low-viscosity fluids. The other reactions were conducted in the presence of pre-swelled CLOISITE $Na^+$ nanoclay and yielded uniform off-white lattices showing no evidence of a separate clay phase. An increase in viscosity is observed as the clay content was increased from 10 to 20% of the overall solids in the reactions.

The particle size of the emulsion polystyrene particles as measured by light scattering for control concentrates 2, 8 and 11 which are conducted in the absence of CLOISITE $Na^+$ nanoclay is fairly small and narrow at 73-79 nm, which is as expected given the level of soap used in the recipes. The particle size is seen to increase slightly for the other reactions carried out in the presence of the CLOISITE $Na^+$ nanoclay. The conversion of styrene monomer is higher for those reactions conducted with the dimer acid soap as seen in the residual styrene as measured by GC and by comparing the measured % solids to that expected from the recipe.

The mass balance results and characterization data for the dried polystyrene resins is shown in Table 2 below.

The recovery by coagulation of the polystyrenic concentrate reactions conducted in the absence of nanoclay from the mixed aqueous dispersion with $H_2SO_4$ and $CaCl_2$, respectively, are on the order of 99% by weight. However, the data for recovery of polystyrenic nanoclay concentrates for con- Good clay dispersion is seen in the X-ray analyses. The TEM and X-ray analyses suggest that the degree of exfoliation in the samples prepared with SLS is slightly better.

These results demonstrate that the in-situ emulsion polymerization of a vinyl monomer such as styrene in the presence of an untreated smectite nanoclay can be used to prepare and recover via salt coagulation a polystyrenic nanoclay concentrate wherein the nanoclay is well dispersed and in an exfoliated state, in relatively high clay concentration. According to one embodiment, the use of a salt coagulation process can be superior to a process using acid coagulation in order to achieve maximum incorporation of the nanoclay into the concentrate. According to another embodiment, the use of an aromatic sulfonate such as KDDBS in the process can also provide superior results.

E. Preparation and Evaluation of Polystyrenic Nanoclay Concentrate in Blends with PPO Resin The dried polystyrenic nanoclay concentrates from the above Table 1 were blended with the required amount of PPO® resin and PS resin powders by shaking in a plastic bag. Control formulations in which the nanoclay powders were used directly were also blended. The blend formulations were adjusted such that the ratio of PPO:PS was maintained at 60:40 by adding the required amount of commercial PS powder to the blends based on the experimental resins. The formulations of the blends are shown in Table 3 below.

The powder blends were melt compounded using the 18-mm twin-screw extruder at a melt temperature of 300-310° C. using a screw rpm of 450 rpm, with a volumetric feed rate adjusted to maintain the die pressure at 35-40 bar. The pelletized formulations were dried in a hot-air oven at 90° C. prior to injection molding into ASTM test specimens at a melt temperature of 325° C. and a mold temperature of 80° C. The molded test specimens were evaluated for tensile and flexural properties and Notched Izod impact strength following ASTM procedures.

The polystyrenic nanoclay concentrates 6-10 in Table 2 above are blended "as-is" with PPE, at an overall weight ratio of PPE to PS of 60:40, to provide clay loadings of 4 and 8%, using the polystyrenic nanoclay concentrates described above (blend examples 13-16 in Table 3 below). Since the polystyrene in these blends is supplied primarily from the polystyrenic nanoclay concentrates, blend control example 12 was prepared from the polystyrene of control concentrate 11 as an unfilled control example. (Note: the pellets for blend example 16 were lost during the injection molding process due to machine failure, but the pellets were still available for DSC analysis).

In comparative example blends 1-11, nanocomposites made from either the untreated CLOISITE Na+ nanoclay (used as the starting material in the concentrates) or the CLOISITE 20A organo-treated nanoclay were evaluated. The polystyrene used to prepare these comparative example blends is an emulsion-prepared UHMW (ultrahigh molecular weight) powdered resin (Chemtura Blendex® 865).

With respect to blends 17-21, the polymeric nanoclay concentrate comprising 20% CLOISITE Na+ nanoclay in polystyrene using KDDBS emulsifier compound was made by a Reaction 12 and Reaction 13 by the same process as reaction 10 in Table 2, except that 0.2 parts of n-dodecyl mercaptan were added to the styrene to adjust the Mw to match that of the crystal PS used in comparative blends. Also, in Reaction 12, the CLOISITE NA+ nanoclay was stirred for 3 hours in the absence of KDDBS emulsifier compound, and then the KDDBS was added to the nanoclay and distilled mineral water prior to adding the initiator and styrene. Delaying soap until just before the styrene is polymerized did not have a significant affect on the results.

Samples from blends 19 and 21 described in Table 3 were subjected to TEM image analysis. The statistics of blend 19 made gave a mean of 144 nm and a standard deviation of 71 nm. The resulting distribution of platelet lengths fits a lognormal distribution within a confidence level of 95% across the range of observations.

The statistics of blend 21 made with the commercially available CLOISITE 20A organoclay gave a mean of 169 nm and a standard deviation of 89 nm. The resulting distribution of platelet lengths tend to fit a lognormal distribution but is broader and shows deviations from the 95% confidence intervals at the extremes of the observed lengths.

Blends 17 to 21 have 60% poly(phenylene oxide) as in the other blends, but also contain some HIPS (high-impact polystyrene) to provide some ductility. For Reactions 12 and 13, the Mn of the polystyrene was 43,017 and 42,494, respectively and the Mw was 260,650 and 242,057, respectively. For the UHMW PS (ultrahigh molecular weight styrene, the Mn was 134,740 and the Mw was 1,286,933. For the XPS (unmodified crystal polystyrene), the Mn was 43,159 and the Mw was 339,390. Thus, in one embodiment, the polystyrene was of a lower molecular weight than one or more, or all, of the blended polystyrenes, although the polystyrene did have an Mw over 200,000 and an Mn over 30,000, in this embodiment.

For both the 20% polymeric nanoclay concentrate and the 10% polymeric nanoclay concentrate, the final blends were formulated to contain 4% clay.

The mechanical properties of the blends were evaluated via melt extrusion and injection molding as described above under Materials and Methods. The results of the testing are also shown in Table 3 below.

TABLE 3

| | Blend | | | | | | |
| --- | --- | --- | --- | --- | --- | --- | --- |
| | C-1 | C-2 | C-3 | C-4 | C-5 | C-6 | C-7 |
| PPO - 0.46 IV | 60 | 58.8 | 57.6 | 55.2 | 58.8 | 57.6 | 55.2 |
| UHMWPS powder | 40 | 39.2 | 38.4 | 36.8 | 39.2 | 38.4 | 36.8 |
| Ground HIPS | | | | | | | |
| Ground XPS | | | | | | | |
| CLOISITE NA nanoclay | | 2.0 | 4.0 | 8.0 | | | |
| CLOISITE 20A nanoclay | | | | | 2.0 | 4.0 | 8.0 |
| Rxn 7 10% NC in PS, SLS | | | | | | | |
| Rxn 6 10% NC in PS, KDDBS | | | | | | | |
| Rxn 9 20% NC in PS, SLS | | | | | | | |
| Rxn 10 20% NC in PS, KDDBS | | | | | | | |
| Rxn 11 Emulsion PS, SLS | | | | | | | |
| Rxn 12 20% NC in PS, KDDBS | | | | | | | |
| Rxn 13 20% NC in PS, KDDBS | | | | | | | |
| Flexural Modulus, Mpa | 3,150 | 3,180 | 3,300 | 3,530 | 3,290 | 3,500 | 3,920 |
| Flex Stress@5% Strain, MPa | 127 | 128 | 130 | 72.7 | 130 | 133 | 140 |
| Unnotched Izod Impact, J/M | 363 | 402 | 363 | 359 | 303 | 296 | 336 |
| Notched Izod impact (L/M) | | | | | | | |
| Tensile Modulus, MPa | 3,123 | 3,073 | 3,150 | 3,450 | 3,228 | 3,472 | 3,858 |
| Tensile Stress at Yield, MPa | 78.3 | 79.1 | 78.6 | 78.1 | 80.7 | 81.1 | 81.7 |
| Tensile Stress at Break, MPa | 70.0 | 71.4 | 77.6 | 77.8 | 80.0 | 80.8 | 81.7 |
| Tensile Elongation at Yield, % | 4.6 | 5.2 | 5.0 | 4.8 | 4.7 | 4.5 | 3.6 |
| Tensile Elongation at Break, % | 15.0 | 7.9 | 5.8 | 5.2 | 5.1 | 4.8 | 3.6 |
| DSC Onset Tg, ° C. (Pellet) | | | 150.8 | 153.3 | | | |
| Heat Deflection temp, 1.84 Mpa, ° C. | 136.8 | 141.0 | 138.4 | 139.5 | 134.9 | 133.1 | 130.4 |

| | Blend | | | | | | |
| --- | --- | --- | --- | --- | --- | --- | --- |
| | C-8 | C-9 | C-10 | C-11 | I-12 | I-13 | I-14 |
| PPO - 0.46 IV | 58 | 56 | 52 | 60 | 60 | 57.6 | 57.6 |
| UHMWPS powder | 39 | 37 | 35 | 40 | | 2.4 | 2.4 |
| Ground HIPS | | | | | | | |
| Ground XPS | | | | | | | |
| CLOISITE NA nanoclay | | | | | | | |
| CLOISITE 20A nanoclay | 3.3 | 6.7 | 13.3 | | | | |
| Rxn 7 10% NC in PS, SLS | | | | | | 40 | |
| Rxn 6 10% NC in PS, KDDBS | | | | | | | 40 |

TABLE 3-continued

| | | | | | | | |
|---|---|---|---|---|---|---|---|
| Rxn 9 20% NC in PS, SLS | | | | | | | |
| Rxn 10 20% NC in PS, KDDBS | | | | | | | |
| Rxn 11 Emulsion PS, SLS | | | | | 40 | | |
| Rxn 12 20% NC in PS, KDDBS | | | | | | | |
| Rxn 13 20% NC in PS, KDDBS | | | | | | | |
| Flexural Modulus, Mpa | 3,520 | 3,810 | 4,510 | 3,120 | 3,070 | 3,540 | 3,580 |
| Flex Stress@5% Strain, MPa | 136 | 138 | 145 | 127 | 126 | 134 | 135 |
| Unnotched Izod Impact, J/M | 303 | 309 | 341 | 368 | 336 | 298 | 264 |
| Notched Izod impact (L/M) | | | | | | | |
| Tensile Modulus, MPa | 3,396 | 3,698 | 4,488 | 2,994 | 2,966 | 3,540 | 3,572 |
| Tensile Stress at Yield, MPa | 82.1 | 79.6 | 77.4 | 80 | 78.7 | 73.5 | 71.9 |
| Tensile Stress at Break, MPa | 81.8 | 79.6 | 77.4 | 57.0 | 78.7 | 73.5 | 71.9 |
| Tensile Elongation at Yield, % | 4.9 | 3.4 | 2.6 | 5.4 | 5.2 | 2.9 | 2.8 |
| Tensile Elongation at Break, % | 5.2 | 3.4 | 2.6 | 37.0 | 5.3 | 2.9 | 2.8 |
| DSC Onset Tg, ° C. (Pellet) | | 146.4 | 141.5 | 150.4 | 150.3 | 149.2 | 152.2 |
| Heat Deflection temp, 1.84 Mpa, ° C. | 133.8 | 131.9 | 125.4 | 136.5 | 133.7 | 139.6 | 139.6 |

| | Blend | | | | | | |
|---|---|---|---|---|---|---|---|
| | I-15 | I-16 | C-17 | I-18 | I-19 | C-20 | C-21 |
| PPO - 0.46 IV | 55.2 | 55.2 | 57.6 | 57.6 | 57.6 | 57.6 | 57.6 |
| UHMWPS powder | 4.8 | 4.8 | | | | | |
| Ground HIPS | | | 22.4 | 22.4 | 22.4 | 22.4 | 22.4 |
| Ground XPS | | | 16.0 | | | 16.0 | 16.0 |
| CLOISITE NA nanoclay | | | | | | 4.0 | |
| CLOISITE 20A nanoclay | | | | | | | 4.0 |
| Rxn 7 10% NC in PS, SLS | | | | | | | |
| Rxn 6 10% NC in PS, KDDBS | | | | | | | |
| Rxn 9 20% NC in PS, SLS | 40 | | | | | | |
| Rxn 10 20% NC in PS, KDDBS | | 40 | | | | | |
| Rxn 11 Emulsion PS, SLS | | | | | | | |
| Rxn 12 20% NC in PS, KDDBS | | | | 20 | | | |
| Rxn 13 20% NC in PS, KDDBS | | | | | 20 | | |
| Flexural Modulus, Mpa | 4,060 | * | 2810 | 3170 | 3200 | 3000 | 3330 |
| Flex Stress@5% Strain, MPa | — | | 112 | 115 | 117 | 114 | 116 |
| Unnotched Izod Impact, J/M | 300 | * | | | | | |
| Notched Izod impact (L/M) | | | 64.3 | 44.1 | 40.4 | 41.7 | 53.4 |
| Tensile Modulus, MPa | 4,158 | * | 2988 | 3446 | 3352 | 3090 | 3440 |
| Tensile Stress at Yield, MPa | 65.6 | * | 75.8 | 73.5 | 73.9 | 72.5 | 70.6 |
| Tensile Stress at Break, MPa | 65.6 | * | — | — | — | — | — |
| Tensile Elongation at Yield, % | 2.0 | * | 5.1 | 4.0 | 4.0 | 4.9 | 5.6 |
| Tensile Elongation at Break, % | 2.0 | * | 8.6 | 5.2 | 5.0 | 8.9 | 11.0 |
| DSC Onset Tg, ° C. (Pellet) | 150.7 | 153.6 | 147.5 | 150.5 | 151.7 | 150.5 | 145.8 |
| Heat Deflection temp, 1.84 Mpa, ° C. | 144.2 | * | 133.4 | 136.7 | 137.9 | 135.5 | 131.7 |

Referring to the blends and results shown in Table 3 above, the tensile & flexural modulus of the PLSNC (polymer-layered silicate nanocomposite) blends at constant filler loading is correlated with the degree of exfoliation of the nanoclay filler. The trends for both tensile and flexural modulus in Table 3 show that the development of high modulus by use of the present polystyrenic nanoclay concentrate approach is far superior to blending untreated CLOISITE $Na^+$ nanoclay directly and even superior to blending the CLOISITE 20A organo-treated nanoclay directly.

One of the key properties of an engineering resin blend is the heat resistance, which is correlated to the glass transition temperature (Tg) of the resin matrix as well as the modulus and is typically reported as the heat deflection temperature under load (HDT). The trends in both Tg and HDT (in Table 3) show a modest trend towards increased Tg and HDT upon addition of the untreated CLOISITE $Na^+$ nanoclay; however, addition of the CLOISITE 20A nanoclay results in a significant decrease in Tg and HDT. Without wishing to be bound by theory, it is theorized that this effect is most likely associated with the presence of the high loading of fatty quaternary amine surface treatment on the CLOISITE 20A nanoclay, which can act as a plasticizer for the PPO/PS resin matrix. In contrast, the blends prepared from the present polystyrenic nanoclay concentrates show a neutral effect on Tg for the SLS soap and a strong increase for the KDDBS soap; the net effect is a strong increase in the HDT of the blends made with the present concentrates.

The morphology of the clay platelets in the PPE/PS blends containing 4% inorganic clay loading determined by TEM is consistent with the trends in mechanical properties. As can be seen in FIG. 1, the untreated CLOISITE $Na^+$ (blend example 3) shows a very poor dispersion in the PPE/PS matrix and is present as larger aggregates, while the blends prepared from blend examples 13 and 14 show very good dispersion of the nanoclay and exfoliation in some areas to individual platelets. The CLOISITE 20A nanoclay blend of Example 9 shows a less complete dispersion of clay at low magnification and primarily intercalation of these agglomerates with the resin, not complete exfoliation.

Figure 2:
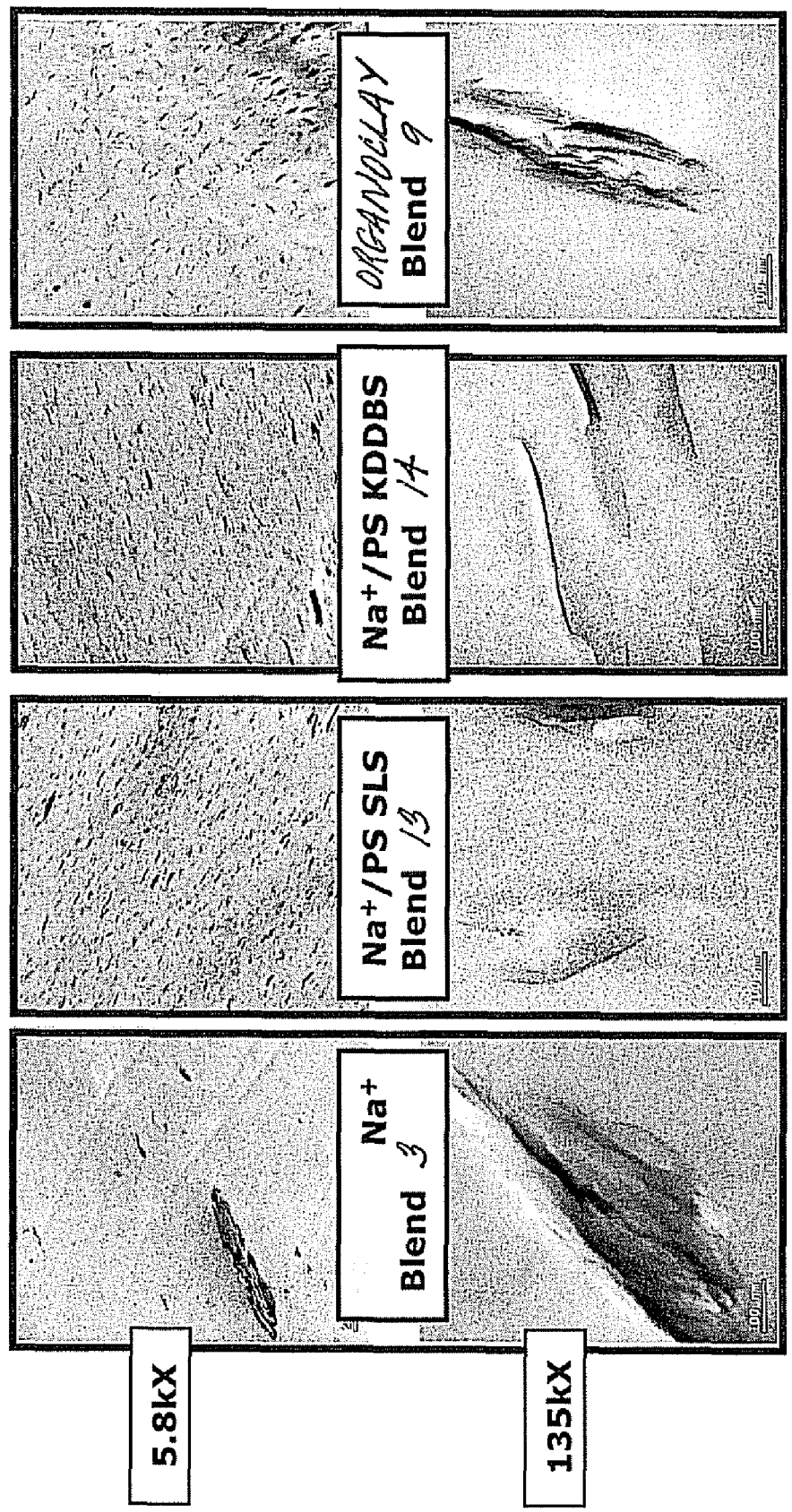
FIG. 2 shows an X-ray diffraction (XRD) spectrum of a nanocomposite made from a polymeric nanoclay concentrate having 10 wt % nanoclay in accordance with the Examples below

These same blends were subject to analysis by X-ray diffraction (FIG. 2) with the result that the blends of examples 13 and 14 show a broad scattering peak indicative of some residual stacking of platelets, but the interlayer distance is much wider (smaller angle) than that seen for the blend of comparative example 3 based on untreated nanoclay. The scattering intensity from the blend of comparative example 9 made from the CLOISITE 20A is regular and intense, consistent with the intercalated structure.

Figure 3:
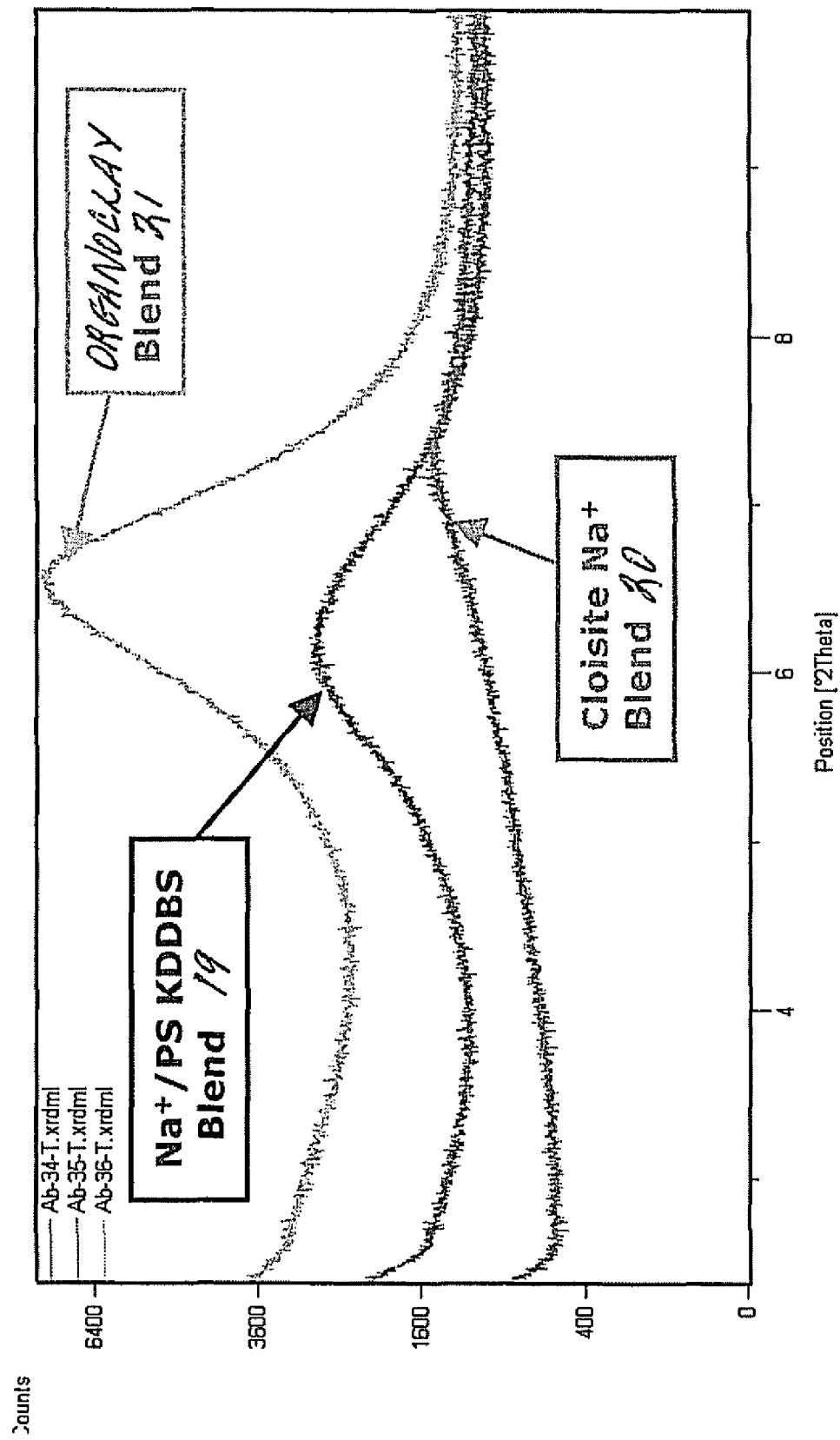
FIG. 3 shows a transmission electron microscope (TEM) image of a nanocomposite made from a polymeric nanoclay concentrate having 20 wt % nanoclay in accordance with the Examples below.

Similarly, as can be seen in FIG. 3, the untreated CLOISITE $Na^+$ (blend comparative example 20) shows a very poor dispersion in the PPE/PS matrix and is present as larger aggregates, while the blends prepared from blend example 19 shows very good dispersion of the nanoclay and exfoliation in some areas to individual platelets. The CLOISITE 20A nanoclay blend of comparative example 21 shows a less complete dispersion of clay at low magnification and primarily intercalation of these agglomerates with the resin, not complete exfoliation.

Figure 4:
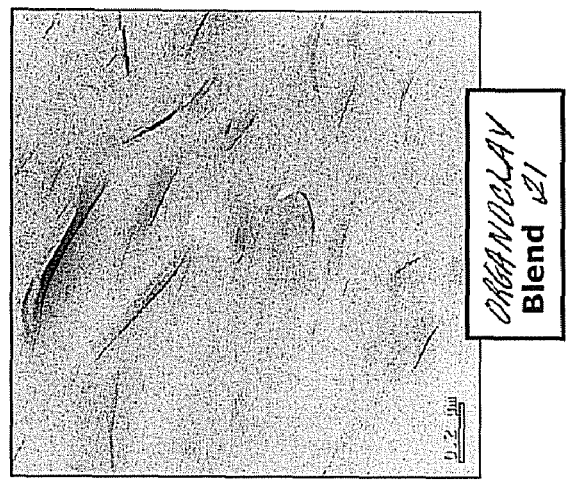
FIG. 4 shows an X-ray diffraction (XRD) spectrum of a nanocomposite made from a polymeric nanoclay concentrate having 20 wt % nanoclay in accordance with the Examples below.
Figure 4:
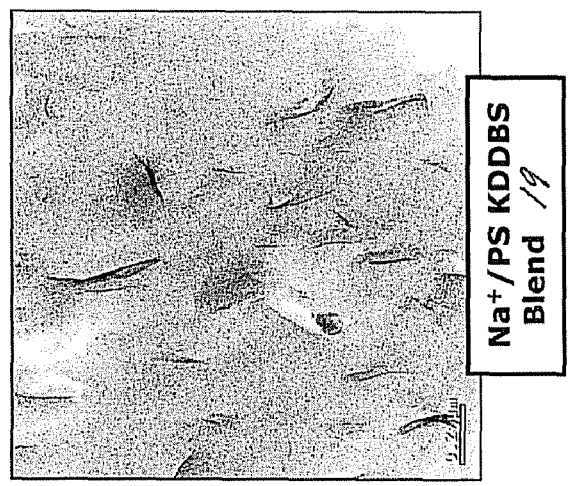
Figure 4:
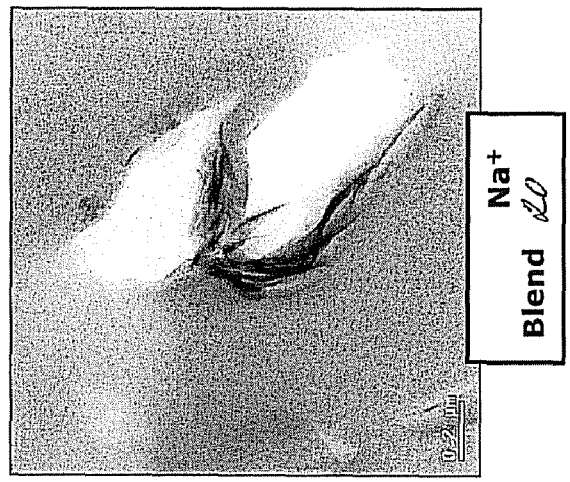

These same blends were subject to analysis by X-ray diffraction (FIG. 4) with the result that the blend of example 19 shows a broad scattering peak indicative of some residual stacking of platelets, but the about 1.42 nm interlayer distance estimated from the peak position is much wider (smaller angle) than the about 1.22 nm estimated for the blend of comparative example 21 based on untreated nanoclay. The scattering intensity from the blend of comparative example 21 made from the CLOISITE 20A is regular and intense, consistent with the intercalated structure seen by TEM; the interlayer distance is estimated at about 1.36 nm which is intermediate between the values obtained from the untreated clay and those from the blend of example 19.

The results of these three characterization methods all point to the same conclusion: the dispersion of the nanoclay in PPE/PS blends made according to the present examples is superior to that achieved by direct melt compounding of organo-treated nanoclay.

These results demonstrate that polystyrenic nanoclay concentrates having a high concentration of well-dispersed nanoclay can be effective in maintaining this high degree of dispersion and exfoliation upon re-extrusion at high temperatures in a blend with engineering resins. Blends prepared from the polystyrenic nanoclay concentrates can develop mechanical properties, such as modulus and heat resistance, which are superior to those developed by an equivalent loading of organo-treated nanoclay which is incorporated by simple melt compounding. The in-situ polymerization for preparing a polystyrenic nanoclay concentrate can further eliminate the need for extensive pre-treatment of the nanoclay with organic modifiers, which can result in a substantial advantage in heat resistance over the conventional organo-treated clays employed to prepare PLSNC blends.

The invention claimed is:

1. A composition comprising:
   a styrenic polymer;
   greater than or equal to 2 wt %, by weight of total composition, of a nanoclay;
   an additional polymer selected from the group consisting of poly(arylene ether)s, polyamides, polyesters, polyolefins, and a second styrenic polymer; and
   an emulsifier compound in a residual amount of at least 500 ppm, based on total weight of the composition; wherein the emulsifier compound comprises an anionic substituent and a $C_2$-$C_{30}$ organic moiety;
   wherein the nanoclay comprises particles that are exfoliated in a polymeric matrix comprising the styrenic polymer and the additional polymer.

2. The composition of claim 1 wherein the additional polymer comprises a poly(arylene ether).

3. The composition of claim 1 wherein the composition has a tensile modulus according to ASTM D618 and a flexural modulus according to ASTM D790 that are improved by at least ten percent compared to the composition without the nanoclay.

4. The composition of claim 3 wherein the heat deflection temperature according to ASTM D648, Method B, is higher compared to the composition without the nanoclay.

5. The composition of claim 2 wherein test specimens of a nanocomposite prepared by injection molding the composition has a flexural modulus of greater than or equal to 3500 MPa according to ASTM D790; a tensile modulus of greater than or equal to 3500 MPa according to ASTM D638; a Tg of greater than or equal to 150° C.; and a heat deflection temperature of greater than or equal to 139° C. according to ASTM D648.

6. The composition of claim 1 wherein the exfoliated nanoclay comprises residual platelets characterized by a mean interlayer distance of at least 1.40 nm as determined by X-ray diffraction.

7. The composition of claim 1 wherein the nanoclay is not an organoclay.

8. The composition of claim 1 wherein the nanoclay has been substantially untreated with an organic quaternary ammonium salt or quaternary amine-bearing vinyl functionality.

9. The composition of claim 1 wherein the mean diameter of the particles of nanoclay is about 50 to 500 nm.

10. The composition of claim 9 wherein the diameter of the particles exhibits a Log normal distribution.

11. The composition of claim 1 wherein the additional polymer comprises a second styrenic polymer selected from the group consisting of polystyrene homopolymers, high-impact polystyrene, halogenated polystyrenes, styrene-maleic anhydride copolymers, acrylonitrile-butadiene-styrene copolymers, styrene-acrylonitrile copolymers, poly-alpha-methylstyrenes, and mixtures thereof.

12. The composition of claim 1 wherein the weight ratio of the styrenic polymer to the total additional polymer in the composition is 1:15 to 10:1.

13. A composition made by the process of:
   obtaining a polymeric nanoclay concentrate, comprising nanoclay in a styrenic polymer, obtained by coagulating a mixture of nanoclay and the styrenic polymer, in the form of a latex, wherein the styrenic polymer has been formed by emulsion polymerization in the presence of an aqueous dispersion of nanoclay and emulsifier compound, wherein the nanoclay in the nanocomposite is not an organoclay, has not been treated with a compound bearing a vinyl functionality, and is selected from the group consisting of montmorillonite, hectorite, saponite, hectorite, mica, vermiculite, bentonite, nontronite, beidellite, volkonskoite, magadite, and kenyaite;
   wherein the polymeric nanoclay concentrate comprises nanoclay in an amount of greater than or equal to 5 percent and less than or equal to 30 percent, by weight of total composition, and styrenic polymer in an amount of greater than or equal to 70 percent and less than or equal to 95 percent, by weight of total composition;
   melt blending the polymeric nanoclay concentrate with an additional polymer to obtain a nanocomposite, wherein the additional polymer comprises a major amount of a poly(phenylene oxide) polymer, based on the total weight of polymers in the nanocomposite;
   wherein the nanoclay in the nanocomposite comprises particles of nanoclay exfoliated in a polymeric matrix comprising the styrenic polymer and the additional polymer;
   wherein the nanocomposite comprises nanoclay in an amount of greater than or equal to 2 percent and less than or equal to 10 percent, by weight of total composition, and total polymer in an amount of greater than or equal to 90 percent and less than or equal to 98 percent, by weight of total composition; and
   wherein test specimens of the nanocomposite prepared by injection molding has a flexural modulus of greater than or equal to 3500 MPa according to ASTM D790; a tensile modulus of greater than or equal to 3500 MPa according to ASTM D638; a Tg of greater than or equal to 150° C.; and a heat deflection temperature of greater than or equal to 139° C. according to ASTM D648.

14. The composition of claim 13 wherein the emulsifier compound is present in an amount of 1 to 10 percent, by weight of total composition, in the polymeric nano clay concentrate.

15. A process of obtaining a nanocomposite comprising:
emulsion polymerizing a reaction mixture comprising styrenic monomers in the presence of an aqueous dispersion of nanoclay and emulsifier compound, wherein an aqueous mixed dispersion comprising styrenic polymer and the nanoclay is formed;
coagulating the aqueous mixed dispersion with a coagulating agent to form a coagulated mixed dispersion comprising nanoclay and styrenic polymer;
solidifying the coagulated mixed dispersion to form a polymeric nanoclay concentrate comprising nanoclay and the styrenic polymer as a carrier resin; and
melt mixing the polymeric nanoclay concentrate with an additional polymer to form a nanocomposite;
wherein the nanoclay in the nanocomposite is exfoliated in a polymeric matrix comprising the styrenic polymer and additional polymer.

16. The process of claim 15 wherein:
said emulsion polymerization comprises dispersing nanoclay in an aqueous carrier, subjecting the nanoclay to mixing and heating until particles of the nanoclay have swollen and dispersed, forming a viscous solution, and dripping a feed of the reaction mixture, comprising styrenic monomer and initiator, into the aqueous dispersion of nanoclay to form emulsion particles of the styrenic polymer;
said coagulation comprises dripping the mixed aqueous dispersion of nanoclay and styrenic polymer into a coagulate solution that has been heated, wherein a slurry is obtained;
said solidification comprises filtering the slurry under vacuum to obtain a wet cake, optionally reslurrying and refiltering, and drying the wet cake under vacuum; and
said mixing comprises melt blending the polymeric nanoclay concentrate with an additional polymer in an extruder, wherein the additional polymer comprises poly(phenylene ether).

17. An article comprising the composition of claim 1.

* * * * *